US012631564B1

(12) United States Patent
Murthy et al.

(10) Patent No.: US 12,631,564 B1
(45) Date of Patent: May 19, 2026

(54) METHOD AND SYSTEM FOR PERFORMING MULTI-ELEMENT ANALYSIS IN REAL-TIME USING MULTI-ELEMENT CONCENTRATION SENSOR

(71) Applicant: Mapana, Inc., Issaquah, WA (US)

(72) Inventors: Sagar Narayana Murthy, Bangalore (IN); Stephan Thodesen, Bristol (GB); Peter K. Jarvis, Vancouver (CA)

(73) Assignee: Mapana Inc., Issaquah, WA (US)

( * ) Notice: Subject to any disclaimer, the term of this patent is extended or adjusted under 35 U.S.C. 154(b) by 110 days.

(21) Appl. No.: 18/339,192

(22) Filed: Jun. 21, 2023

Related U.S. Application Data

(60) Provisional application No. 63/355,068, filed on Jun. 23, 2022.

(51) Int. Cl.
  *G01N 1/34* (2006.01)
  *G01N 1/28* (2006.01)
  (Continued)

(52) U.S. Cl.
  CPC ........... *G01N 21/718* (2013.01); *G01N 1/286* (2013.01); *G01N 1/34* (2013.01); *G01N 21/274* (2013.01); *G01N 21/8851* (2013.01); *G01N 2001/2866* (2013.01); *G01N 2021/8896* (2013.01); *G01N 2201/06113* (2013.01);
  (Continued)

(58) Field of Classification Search
  CPC ........ G01N 21/718; G01N 1/286; G01N 1/34;

G01N 21/274; G01N 21/8851; G01N 2001/2866; G01N 2021/8896; G01N 2201/06113; G01N 2201/0698; G01N 2201/102
  See application file for complete search history.

(56) References Cited

U.S. PATENT DOCUMENTS 6,268,943 B1 * 7/2001 Kang ...................... H04J 14/02
                                                        398/9
6,407,811 B1 * 6/2002 Snyder ................. G01N 21/718
                                                        356/316

(Continued)

FOREIGN PATENT DOCUMENTS

GB          2432947 A * 6/2007 ............. H04J 14/08
WO   WO-2018024841 A1 * 2/2018 ............. B07C 5/342

*Primary Examiner* — Jamil Ahmed
(74) *Attorney, Agent, or Firm* — CHIP LAW GROUP

(57) ABSTRACT
A system for performing multi-element analysis in real-time using a multi-element concentration sensor and methods for making and using same. The system can perform an analysis of one or more varieties of samples to provide rapid infield elemental analysis and characterize the samples in real-time. The system can utilize one or more light sources with variable optical capability and variable intensities to emit intense and short pulses of light for ablating matter from a sample target. Advantageously, the system can include a sample preparation module for preparing the sample target prior to application of the light pulses. Interaction of the light pulses with vaporized matter can create an excited plasma plume that can comprise external light source-induced excited plasma sources for allowing a specific optical response resulting from the electronic relaxation of atoms and ions excited by a high plasma temperature to be elicited from matter constituting the sample.

18 Claims, 22 Drawing Sheets

100

(51) Int. Cl.
  *G01N 21/27* (2006.01)
  *G01N 21/71* (2006.01)
  *G01N 21/88* (2006.01)
(52) U.S. Cl.
  CPC ................ *G01N 2201/0697* (2013.01); *G01N 2201/0698* (2013.01); *G01N 2201/102* (2013.01)

(56) References Cited

U.S. PATENT DOCUMENTS

| | | | | |
|---|---|---|---|---|
| 2012/0099103 A1* | 4/2012 | Hahn | ................... | G01N 21/718 |
| | | | | 356/316 |
| 2019/0378625 A1* | 12/2019 | Cho | ..................... | G02B 27/283 |
| 2021/0341392 A1* | 11/2021 | Bol'shakov | ......... | H01J 49/0463 |
| 2022/0077949 A1* | 3/2022 | Kato | ................... | H04B 10/572 |

* cited by examiner

1000

400

500

510 — Emitting light toward a sample

520 — Capturing one or more images of plasma produced from the sample

530 — Detecting light emitted from one or more elements or other matter of the sample 590 — Characterizing the elements or other matter of the sample based upon the captured images and the detected light

500

510 — Emitting light toward a sample

520 — Capturing one or more images of plasma produced from the sample

530 — Detecting light emitted from one or more elements or other matter of the sample 540 544 — Modulating the detected light 590 — Characterizing the elements or other matter of the sample based upon the captured images and the detected light

500

510 — Emitting light toward a sample

520 — Capturing one or more images of plasma produced from the sample

530 — Detecting light emitted from one or more elements or other matter of the sample 590
592 — Extracting timing information from the detected light 510 — Emitting light toward a sample 520 — Capturing one or more images of plasma produced from the sample 530 — Detecting light emitted from one or more elements or other matter of the sample 570 — Performing a calibration 590 — Characterizing the elements or other matter of the sample based upon the captured images and the detected light

500

500

510 — Emitting light toward a sample

520 — Capturing one or more images of plasma produced from the sample

530 — Detecting light emitted from one or more elements or other matter of the sample 590 / 594 — Determining a plasma temperature of one or more external light source-induced excited plasma sources associated with the sample

500

504 Initializing a sample 510
512 Emitting light toward the sample

520 Capturing one or more images of plasma produced from the sample

530 Detecting light emitted from one or more elements or other matter of the sample 590 Characterizing the elements or other matter of the sample based upon the captured images and the detected light

METHOD AND SYSTEM FOR PERFORMING MULTI-ELEMENT ANALYSIS IN REAL-TIME USING MULTI-ELEMENT CONCENTRATION SENSOR

CROSS-REFERENCE TO RELATED APPLICATIONS

This application claims the benefit of, and priority to, U.S. Provisional Application Ser. No. 63/355,068, filed on Jun. 23, 2022, the disclosure of which is hereby incorporated herein by reference in its entirety and for all purposes.

FIELD

The present disclosure generally relates to multi-element analysis and more particularly, but not exclusively, to performing multi-element analysis in real-time using a multi-element concentration sensor (MECS).

BACKGROUND

The fundamental mental role of major, minor, and trace elements in different biological, agronomy, physiological and pathological processes make elemental analysis of samples a significant issue. Most often, tools used for the analysis of the elemental composition of samples include Flame and Graphite Furnace Atomic Absorption Spectroscopy (F-AAS and GF-AAS), Inductively Coupled Plasma Optical Emission Spectroscopy (ICP-OES), and Inductively Coupled Plasma Mass Spectrometry (ICP-MS). Conventional portable solutions include Laser Induced Breakdown spectroscopy (LIBS), total reflection X-ray fluorescence spectroscopy, etc. Each of these techniques has many advantages and limitations that should be considered in the first stage of planning the measurement procedure. Their reliability can be checked in the validation process, and precision, trueness, and detection limits of elements belong to the most frequently determined validation parameters.

Conventional atomic spectroscopic techniques such as inductively coupled argon plasma optical emission spectroscopy (ICP-OES), ICP-mass spectroscopy (ICP-MS), and atomic absorbance spectroscopy (AAS) have excellent analytical performance. Still, their sample preparation method is destructive and environmentally hazardous. The sample preparation method usually involves acid-digestion of silicate and organic matrix under elevated temperature and pressure conditions, which requires dangerous chemical use and disposal and is time-consuming. Compared to conventional elemental analytical methods, LIBS has numerous advantages, such as a simple and compact experimental setup, less sample preparation, less destructive surface analysis, remote in-situ analysis in hostile environments for hazardous or inaccessible targets, etc.

Due to its inherent advantages, LIBS developed very fast since its invention in the 1960s and has been successfully applied for both qualitative and semi-quantitative analysis in a wide range of areas, including environmental monitoring (Hahn and Lunden, 2000; Samek et al., 2000; Hettinger et al., 2006), industrial monitoring (Grant et al., 1991; Kraushaar et al., 2003; García et al., 2004), space exploration (Cremers and Radziemski, 2006), and various material analysis such as pigments identification in painted artworks (Anglos et al., 1997), archaeological excavations (Melessanaki et al., 2002), biological (Labbé et al., 2008), geological (Anzano et al., 2006), and agricultural materials (Vadillo et al., 1999; Sirven et al., 2006; Kaiser et al., 2007), etc.

Despite having tremendous advantages over other spectroscopic techniques, LIBS also has limitations. For example, varying signal intensity, the relatively high limit of detection (LOD), repeatability of results, and matrix-dependency of measurement. Many studies have investigated environmental factors and instrumental parameters that influence the analytical performance of LIBS. The solutions used to reduce and solve the problems included applying a rotating stage, an average of accumulated laser shots, and the homogenization of samples.

On the other hand, substance analysis methods based on optical means have risen in popularity in the last couple of decades. A similarity among all these methods is that chemical interactions between biomolecules produce changes that affect some measurable optical properties, such as the emission spectrum, absorption spectrum, or index of refraction. The changes in the optical properties can occur in the analyte itself or through a mediator such as the surface on which the interaction takes place. These changes are then monitored using a beam of incoming light (usually laser light), which in turn changes the outgoing light spectrum (e.g., fluorescence), intensity (e.g., absorption), or phase (e.g., surface plasmon resonance and any interferometric method).

While the majority of the optical bio-analysis methods have found niche applications and markets, one method that became highly popular and influential was microarray optical fluorescence scanning. Such optical scanning has enabled running tests on tens of thousands of small samples in a relatively short period of time. The significant advantages of the microarray optical fluorescence scanning method include performance (sensitivity and signal to noise ratio (SNR)); b) speed, and c) miniaturization of the sampled analyte. These parameters define the efficiency and superiority of the microarray optical fluorescence scanning method.

Currently, microarray elements are spotted on top of a flat substrate chip usually made of glass, plastic, or epoxy. Subsequently, the chip is scanned using confocal scanning systems. The exciting light and the resulting fluorescence light are both shined and collected from above and analyzed using a single photo-multiplier (PMT) detector. This arrangement suffers from inherent limitations, including a short interaction length between the bio-sample and the light (usually a single mono-layer). This short interaction length limits the signal strength and thus the SNR. Another limitation is a high background noise because the back-reflected light and the emitted fluorescent light travel in the same direction. A further limitation is the high sensitivity to the chip's planarity and position need to be maintained in focus. Still, another limitation is slow operation due to the need to have a large enough number of 'pixels' (scanned spots) within every sample and a long enough integration time. Yet another limitation is the need for a complicated optical and mechanical structure that entails bulky and expensive systems.

In general, procedures for proper sampling, preparation and analysis of leaves have been standardized to achieve meaningful comparison and interpretations. If the procedures and preparations are implemented correctly, chemical analysis reliability, data interpretation, fertilization recommendations, and fertilizer program adjustments can be done efficiently. Accordingly, considerable care should be taken from when leaves are selected for sample to when they are received at a laboratory for analysis.

Concerning the timing, for example, samples of leaves should be taken at a correct time of year because nutrient concentrations within leaves continuously change. As leaves age from spring through fall, nitrogen (N), phosphorus (P), and potassium (K) concentrations decrease; calcium (Ca) increases; and magnesium (Mg) first increases and then decreases. However, mineral concentrations of leaves are relatively stable from four to six months after leaf emergence in the spring. In yet another limitation, the best time to collect four- to six-month-old spring flush leaves is July and August. If leaves are sampled later in the season, summer leaf growth can be confused with spring growth.

Generally, essential elements determination in most routine laboratories requires sample pre-treatments such as washing, drying and grinding with further wet acid decomposition in open or closed systems. Therefore, a most recommended method for sizeable routine analysis of the acid digests is ICP OES, due to its inherent multi-elemental and simultaneous analytical capabilities. For instance, the macronutrients P, K, Ca, Mg, and sulfur(S), as well as the micronutrients iron (Fe), copper (Cu), manganese (Mn), zinc (Zn) and boron (B) can be determined in approximately thirty seconds in each acid digest.

Alternatively, atomic absorption spectrometry can be successfully used for K, Ca, Mg, Fe, Cu, Mn, and Zn determinations in air-acetylene (or air-C2H2) flame, flow injection spectrophotometry for P and B, and flow injection turbidimetry for S determination in the same acid digest. For plant diagnosis, in addition to the above-mentioned analytes, it is also necessary to determine N, and this task requires another digestion method.

All these methods have been used at the CENA laboratory in the last thirty years for extensive routine scale analysis. However, there is still an analytical challenge, not fully solved, for the direct analysis of plant materials. In the past, there was an attempt to dc-arc optical emission spectrometry for this purpose by making conductive pellets just by mixing high purity graphite powder with ground plant materials, but the idea was not easily implemented because of the lack of certified reference materials for calibration, difficulties for appropriated sample mixing and impossibility to determine K and S (no analytical channels available in the simultaneous atomic emission spectrometer).

In some existing methods, total concentrations of phosphorus (P), potassium (K), calcium (Ca), sulfur(S), magnesium (Mg), boron (B), copper (Cu), iron (Fe), manganese (Mn), zinc (Zn), sodium (Na), aluminum (Al), nickel (Ni), cadmium (Cd), lead (Pb), arsenic (As), chromium (Cr), selenium (Se), and molybdenum (Mo) are determined with Inductively Coupled Plasma-Optical Emission Spectrometry (ICP-OES) (Spectro Arcos EOP and Arcos II EOP, Spectro Analytical: A Division of Ametek; Mahwah, NJ) (Donohue and Aho 1992; adapted USEPA 2001), after closed-vessel nitric acid (HNO3) digestion in a microwave digestion system (MARS 6 Microwaves; CEM Corp.; Matthews, NC). For most elements, one-half gram of dried/ground aliquot is digested in ten milliliters 15.6N HNO3. However, when heavy metals (Ni, Cd, Pb, As, Cr, Se) or Mo are requested, a 1.0 g aliquot of dried/ground sample is digested in fifteen milliliters or ten milliliters HNO3, respectively. Samples are digested for thirty minutes at 200° C. in a microwave (Plant Materials method; CEM), and the digested sample volume is brought to fifty milliliters with deionized water and then filtered through pre-folded Whatman #2 filter paper (Folded Filter Paper, Albuquerque, NM). Elements are measured at wavelengths. Results are expressed as a percentage (%) for P, K, Ca, Mg, S, and Na and in parts per million (ppm) [equivalent to milligrams per kilogram (mg/kg)] for all other elements on a dry-weight basis.

These challenges are mainly due to complex interaction between samples and sensors, as well as adverse working conditions. The physical and chemical characteristics of samples (e.g., crops) often vary considerably over time and space. As for other detected specimens, such as Plants, soil, and agricultural products, the variation among samples may also differ greatly. These may cause a severe 'matrix effect,' and the experimental parameters which perform well in other areas may not be suitable in agriculture. Furthermore, the regular standard for toxic metals, as well as the recommended nutrients, is usually around the level of ppm, even ppb. Therefore, the detection demand is higher than that in the industry. On the other hand, the working conditions in agriculture (usually outside the laboratory) have detrimental effects on detection performance. Therefore, more reliable and rugged instruments with more stable quantitative methods are required.

Sampling techniques vary with the crop. In some cases, such as cereal crops, leaf samples are taken. In a few cases, for example suspected boron deficiency in sugar beet, the roots should be sampled.

In any sampling of plant material great care should be taken to avoid soil contamination. This is true, for example, when sampling for major element analysis and when trace element analysis is concerned because the contaminating soil may contain very much more of some trace elements than does the crop and a false result will be obtained.

A representative sample of the crop is taken. One or two whole plants taken from an area may be completely unrepresentative. Samples should be taken from between fifty and one hundred plants in a given area. If called in, the advisory services may want to take samples themselves or advise on which part of the plant to sample.

If a deficiency or toxicity condition is suspected in only a part of a field, 'good' and 'poor' areas should be sampled for comparison in the laboratory. Leaves or other parts of the plant of the same age or growth stage should be taken simultaneously.

Containers for transporting the samples should not contaminate the samples. Tins, other metal containers and even some paper bags can cause severe contamination of the sample. The best container is a clean polythene bag. After taking the sample, labels should be attached, the bag sealed, and transferred to the laboratory as quickly as possible.

The user (sampler) should initially make sure that a selected tree is representative of an average within the block being sampled. Each leaf sample should consist of approximately one hundred leaves taken from nonfruiting twigs of between fifteen and twenty uniform trees of the same variety and rootstock that have received the same fertilizer program. Thereafter, clean paper bags are used to store the sample, and the bags are labelled with an identification number that can be referenced when the analytical results are received. Immature leaves should be avoided due to their rapidly changing composition. Proper care has to be taken for not sampling abnormal-appearing trees, trees with block's edge. Leaves with diseased, insect-damaged, or dead leaves in the sample should be avoided.

Growth disorders are diagnosed, and samples are collected from both affected trees as well as typical trees and labelled each gad separately. Trees selected for comparison sampling should be of the same age, scion type, and rootstock.

Selected leaves are handled by protecting from heat and keeping them dry. The selected leaves are placed in a refrigerator for overnight storage if the leaves cannot be washed and oven-dried during the day of collection. For macronutrient analysis, leaves do not need to be washed, wherein the macronutrients can be such as, but not limited to, N, P, K, Ca and Mg. For micronutrient determinations, leaf samples should be washed by hand soon after collection and before the leaves hydrate. Leaves should be rubbed between the thumb and forefinger while soaking them in a mild detergent solution and then thoroughly rinsed with distilled or deionized water, and the leaves should be dried at about 140° F.

In yet another limitation, for sample processing using existing analytical methods, samples are examined for condition (e.g. mold, inadequate mass for analysis) and correct plant part. Depending upon the crop, sufficiency ranges may be based on leaf blade only, petiole only or the whole leaf (blade plus petiole). Where sufficiency ranges are based on the leaf blade only or petiole only, it is recommended that the petiole be detached in field so that nutrients are not moving from the petiole into the leaf blade tissue during shipment to the lab.

Therefore, the need exists for performing multi-element analysis to provide rapid infield elemental analysis using a portable user-friendly measuring system.

BRIEF DESCRIPTION OF THE FIGURES

The accompanying figures, where like reference numerals refer to identical or functionally similar elements throughout the separate views and which, together with the detailed description below, are incorporated in and form part of the specification, serve to further illustrate various embodiments and to explain various principles and advantages all in accordance with the present disclosure.

The figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE PREFERRED EMBODIMENTS

Figure 1A:
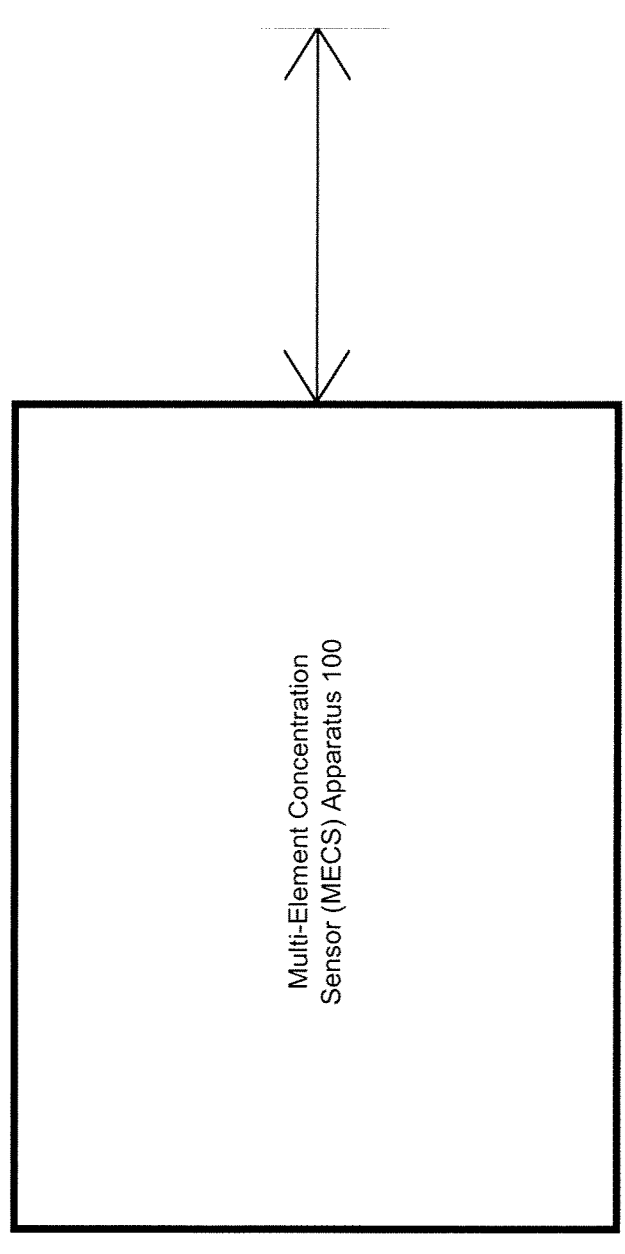
FIG. 1A is a top-level block diagram illustrating an exemplary embodiment of a multi-element concentration sensor (MECS) apparatus for performing multi-element analysis on a sample.

The present disclosure is directed toward a system, method and apparatus for performing multi-element quantitative and/or qualitative analysis. The multi-element quantitative and/or qualitative analysis, for example, can be performed via a multi-element concentration sensor (MECS) apparatus 100 as illustrated in FIG. 1A. The MECS apparatus 100 advantageously can perform or otherwise provide an elemental analysis of a sample 155 and/or characterize the sample 155. In selected embodiments, the MECS apparatus 100 can comprise a portable apparatus. The MECS apparatus 100, for instance, can include a portable housing (not shown). Additionally and/or alternatively, the MECS apparatus 100 can be configured for performing a rapid infield elemental analysis of the sample 155 or otherwise characterizing the sample 155 in a real time manner and/or in a time-delayed manner.

The MECS apparatus 100, its components and associated methodology as disclosed herein have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Advantageously, the MECS apparatus 100 can utilize one or more preloaded models to provide the elemental analysis or otherwise characterize a variety of different types of samples 155. The MECS apparatus 100, for example, can measure a wide range of elements from the periodic table and any new element beyond the periodic table. Additionally and/or alternatively, the MECS apparatus 100 also measure and/or calibrate one or more parameters of materials that can include, but are not limited to, external ambient environment, temperature, noise, internal instrument material noises, and/or signatures of elements. In selected embodiments, the MECS apparatus 100 can perform real-time calibration for elementally dependent disparities affecting accuracy and precision assessments that can include, but are not limited to, heterogeneity, analysis times, instrument stability during analyses, protective thin films, sample thickness, sample width, analyte interferences, detector resolution, power source fluctuations and instrumental drift, moisture, and/or water content.

Figure 1B:
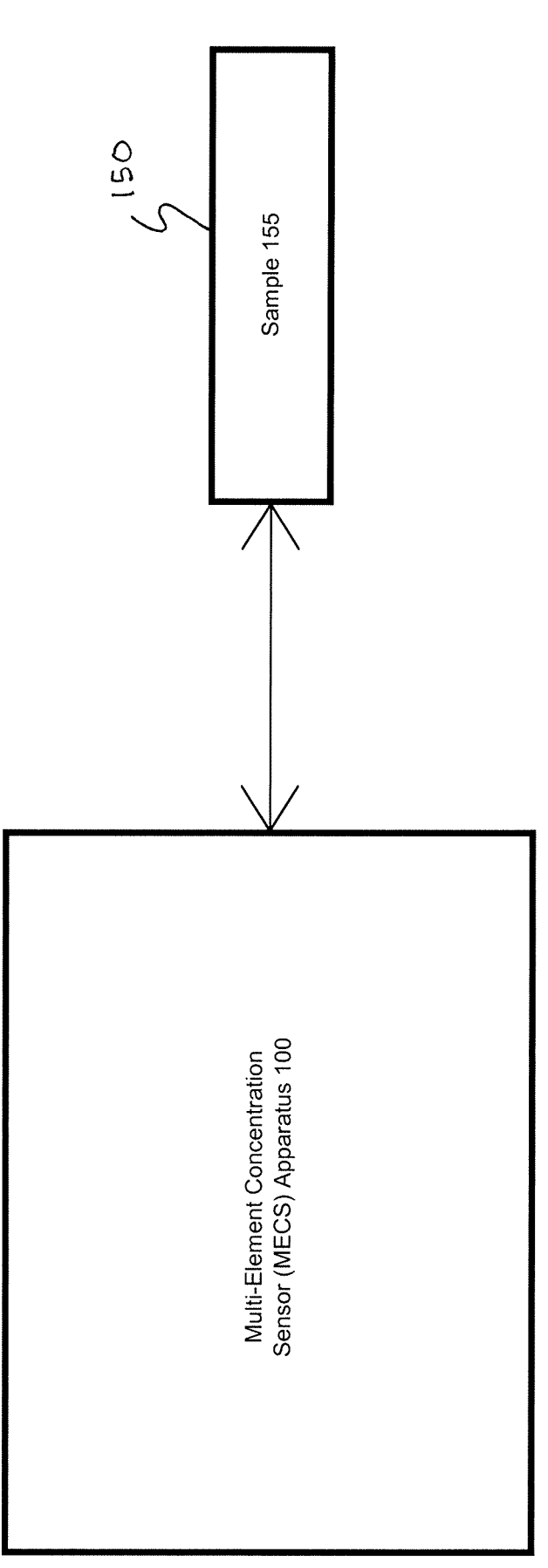
FIG. 1B is a top-level block diagram illustrating an exemplary alternative embodiment of the MECS apparatus of FIG. 1A, wherein the sample is positioned in a sample chamber.

In selected embodiments, the sample 155 optionally can be disposed in a sample chamber 150 as shown in FIG. 1B. The sample 155 can be disposed in the optional sample chamber 150, for example, for elemental analysis and/or characterization via the MECS apparatus 100. The sample chamber 150 can be made of one or more compatible materials and can be configured to hold samples 155 for performing the elemental analysis, the characterization or other measurements. Exemplary samples 155 can include, but are not limited to, elements from the period table, elements beyond the periodic table, soil samples, material samples, plant samples and/or leaf samples. In selected embodiments, the sample chamber 150 advantageously can intelligently avoid use of inert gases, such as Argon (Ar), in operation.

Figure 2:
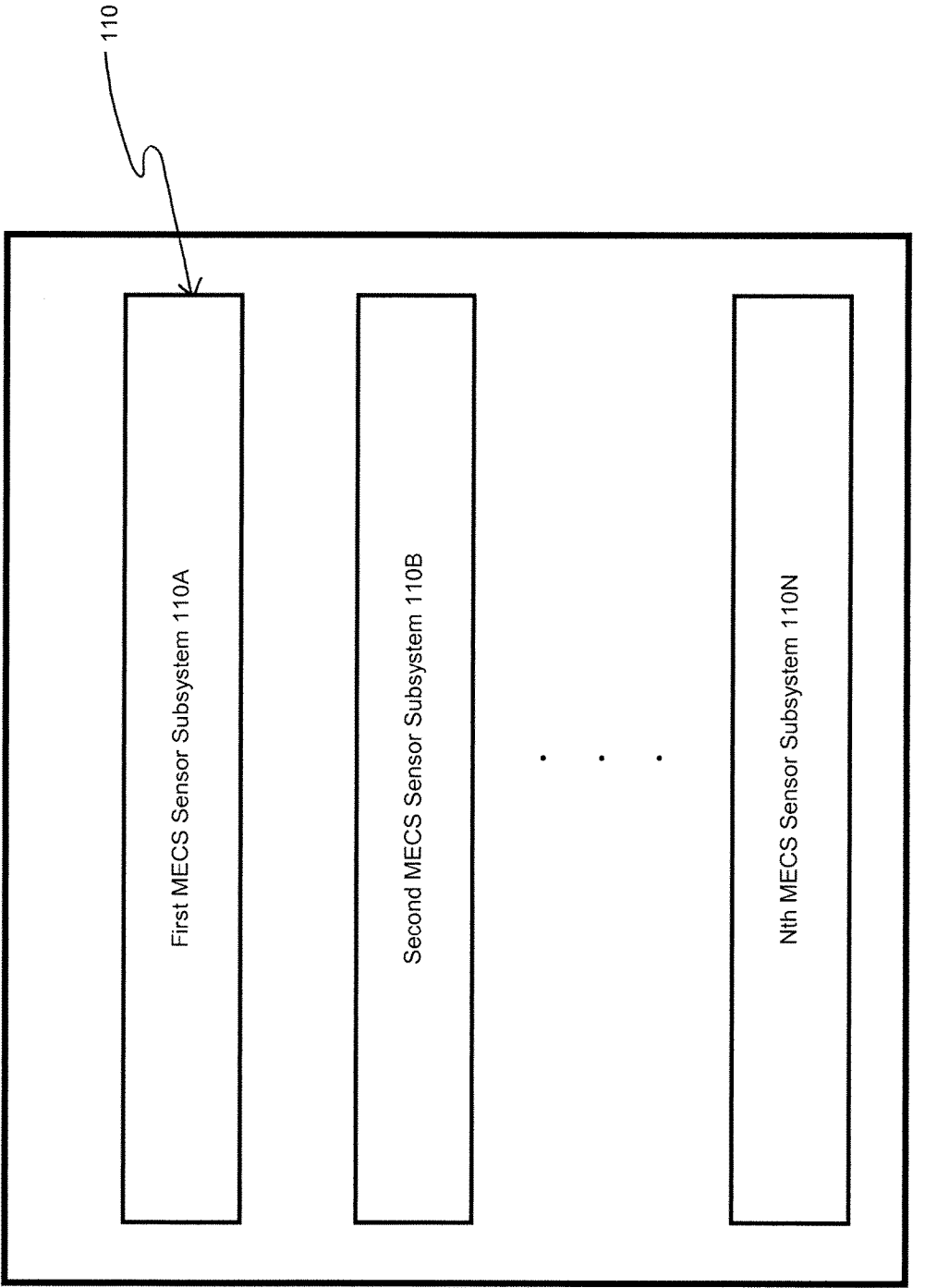
FIG. 2 is a top-level block diagram illustrating another exemplary alternative embodiment of the MECS apparatus of FIGS. 1A-B, wherein the MECS apparatus comprises a plurality of the MECS sensor subsystems.

The MECS apparatus 100 can be provided in any suitable manner. Turning to FIG. 2, for example, the MECS apparatus 100 is shown as comprising one or more MECS subsystems 110. The MECS apparatus 100, in other words, can comprise a predetermined number N of MECS subsystems 110 each being associated with respective functions for providing the elemental analysis or otherwise characterizing the sample 155 (shown in FIG. 1A). A first MECS subsystem 110A can be configured to perform a first function related to the elemental analysis or other characterization for the sample 155. A second function related to the elemental analysis or other characterization for the sample 155 can be performed via a second MECS subsystem 110B; whereas, an Nth function related to the elemental analysis or other characterization for the sample 155 can be performed via an Nth MECS subsystem 110N.

The MECS apparatus 100 can comprise uniform and/or different MECS subsystems 110. In other words, the MECS apparatus 100 can include two or more identical MECS subsystems 110 and/or two or more different MECS subsystems 110. The first function performed by the first MECS subsystem 110A, for example, can be the same as the second function performed by the second MECS subsystem 110B and/or different from the Nth function performed by the Nth MECS subsystem 110N.

In selected embodiments, the MECS apparatus 100 can include a processing system (or circuit) 120 and/or a memory system (or circuit) 130. The processing system 120 can comprise one or more suitable processing devices with logic, interfaces, and/or code that may be configured to execute the instructions stored in the memory system 130 to implement the various functionalities performed by the MECS apparatus 100. Stated somewhat differently, the processing system 120 can comprise any appropriate number and type of conventional processing systems, such as one or more microprocessors (μPs), central processing units (CPUs), digital signal processors (DSPs), and/or coder/decoders (CODECs). The processing system 120 advantageously can process data generated by the MECS subsystems 110 or other components of the MECS apparatus 100.

The memory system 130 can comprise one or more suitable memory devices with logic and/or interfaces for storing computer-readable program code or other instructions to implement the various functionalities performed by the MECS apparatus 100 and/or the data generated by the MECS subsystems 110 or other components of the MECS apparatus 100. Exemplary memory systems 130 can comprise any conventional type of memory system, such as any suitable electronic, magnetic, and/or optical storage media, without limitation. Exemplary storage media can include, but are not limited to, one or more static random access memories (SRAMs), dynamic random access memories (DRAMs), electrically-erasable programmable read-only memories (EEPROMs), FLASH memories, hard drives (HDDs), compact disks (CDs), and/or digital video disks (DVDs) of any kind.

Figure 3:
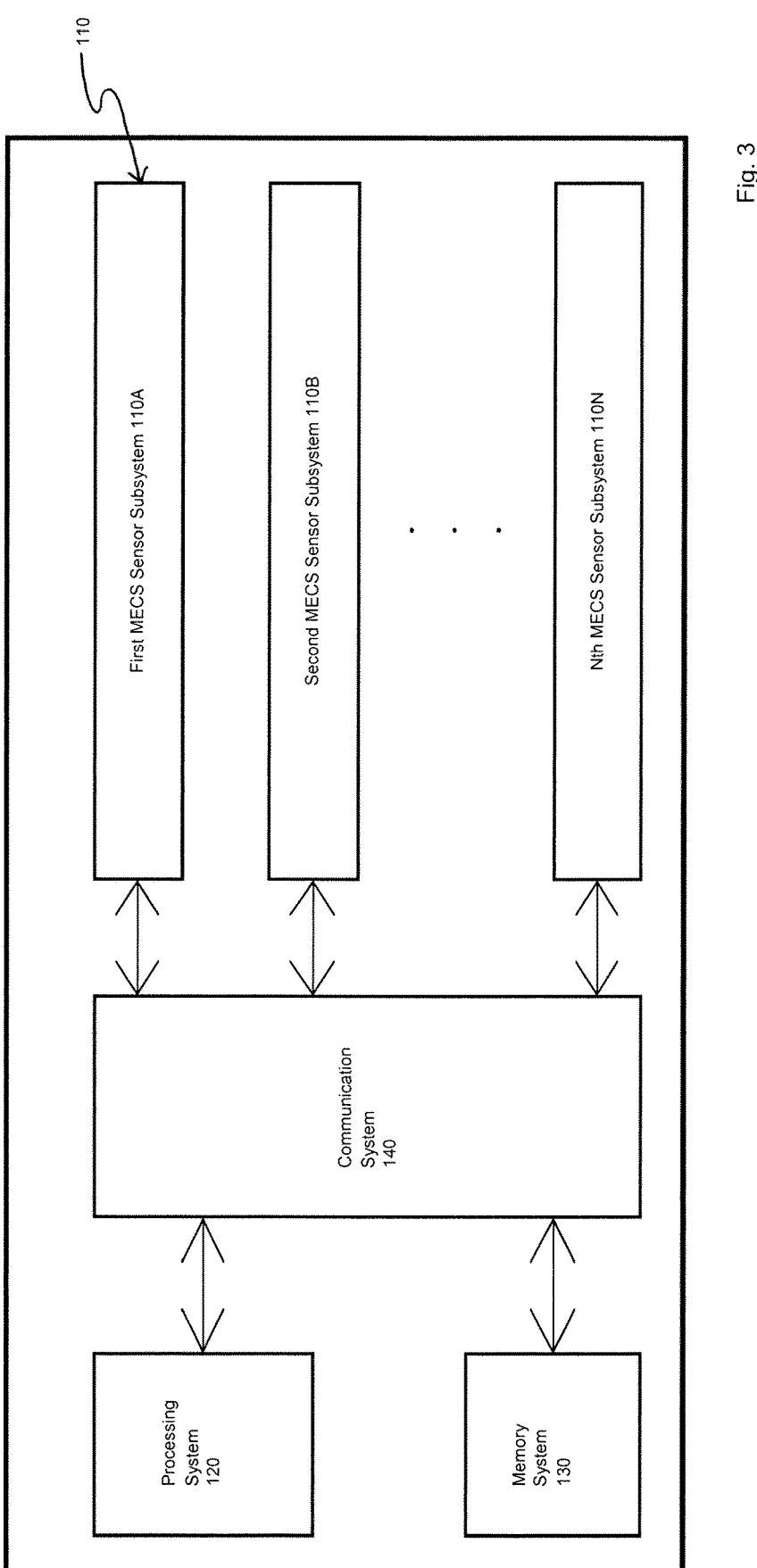
FIG. 3 is a top-level block diagram illustrating an exemplary alternative embodiment of the MECS apparatus of FIG. 2, wherein the MECS apparatus further comprises a processing system and a memory system.

The processing system 120, the memory system 130 and the MECS subsystems 110 can communicate in any suitable manner. For example, the processing system 120, the memory system 130 and the MECS subsystems 110 can communicate directly and/or indirectly via one or more intermediate systems (or circuits). The processing system 120, the memory system 130 and the MECS subsystems 110 are illustrated in FIG. 3 as being configured to communicate via an intermediate communication system (or circuit) 140. The communication system 140 can be provided in any suitable manner and preferably comprises suitable logic, interfaces, and/or code that can be configured for exchanging data among the processing system 120, the memory system 130, the MECS subsystems 110 and other components of the MECS apparatus 100 during operation. In selected embodiments, the communication system 140 can support one or more communication types and/or utilize one or more communication methods for providing communication within the MECS apparatus 100.

Figure 4A:
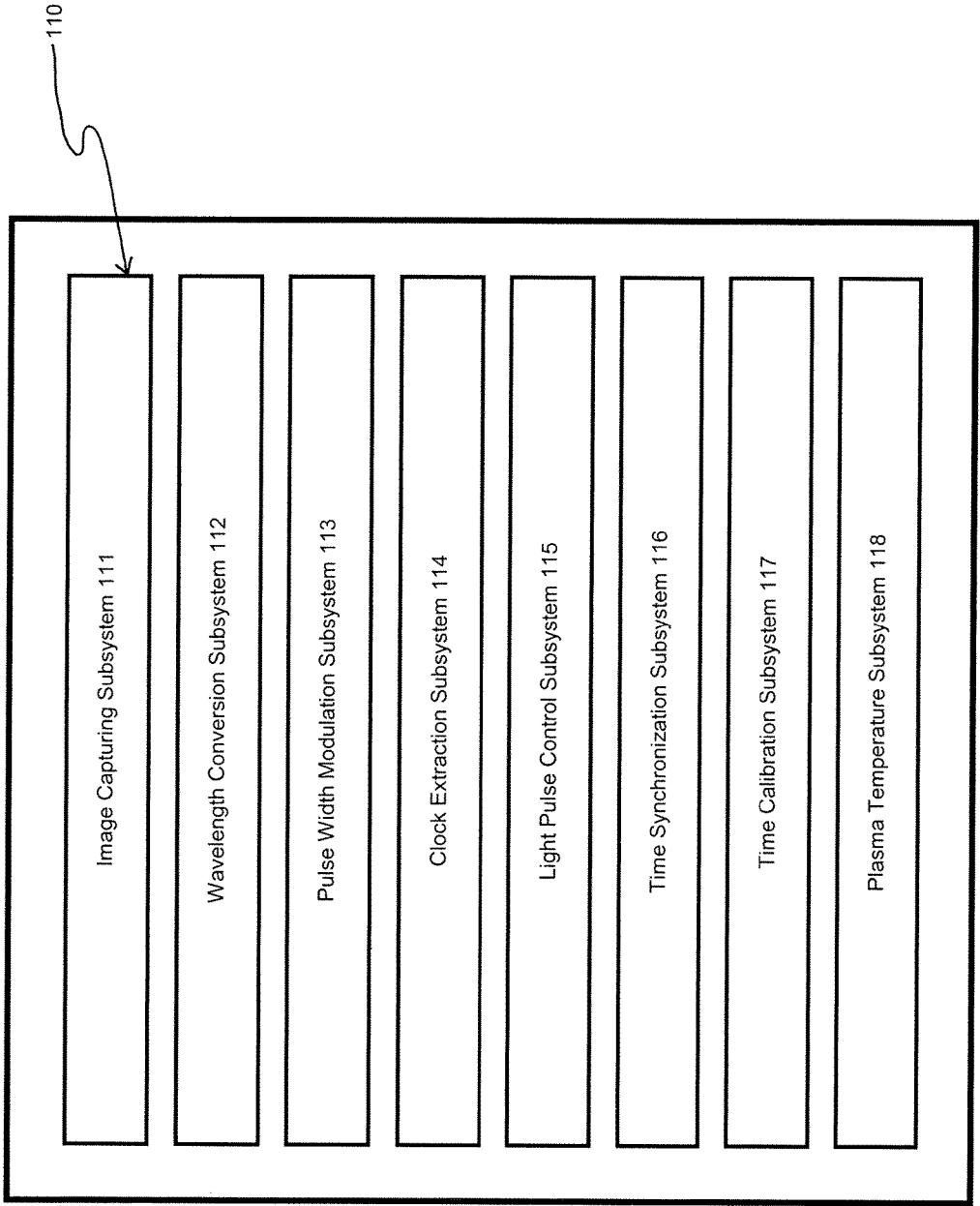
FIG. 4A is a detail drawing illustrating another exemplary alternative embodiment of the MECS apparatus of FIG. 2, wherein the MECS sensor subsystems include an image capturing subsystem.

An exemplary MECS subsystems 110 for the MECS apparatus 100 are shown and described with reference to FIGS. 4A-C. Turning to FIG. 4A, the MECS apparatus 100 is illustrated as including an image capturing subsystem (or circuit) 111. An exemplary image capturing subsystem 111 can include, but is not limited to, a high-speed camera device (or circuit). The high-speed camera device can record six frames by image-intensified charge-coupled device (or CCD) cameras with an exposure time between one nanosecond and twenty nanoseconds and arbitrary delay time without limitation. Advantageously, the high-speed camera device can record laser ablation in air and/or a vacuum chamber with surface roughness. The high-speed camera device optionally can be configured to capture photographs with successive adjustable delay times of one-half microsecond, one microsecond, two microseconds and/or three microseconds and the sample images. The image capturing subsystem 111 can be configured to capture an image of the sample 155 (shown in FIG. 1A). In selected embodiments, the image capturing subsystem 111 can be configured to capture light reflected off of the sample 155 during operation.

The image capturing subsystem 111 can be provided in any suitable manner. As shown in FIG. 4B, for example, the image capturing subsystem 111 is shown as including a light emitting device (or circuit) 111A, an image capturing device (or circuit) 111B and/or a light receiving device (or circuit) 111C. The light emitting device 111A can comprise one or more sources of light for emitting light with respective wavelengths. In selected embodiments, the light emitting device 111A can include a variable optical capability for controlling the wavelengths, intensity and/or power of the emitted light. Stated somewhat differently, each light source can be capable of emitting light of different wavelengths, such as between two hundred nanometers and two thousand nanometers, and optical capacities but emits light with a fixed wavelength and a fixed optical capacity toward the sample 155.

Additionally and/or alternatively, the light emitting device 111A can comprise a repetitively-fired pulsated light source for emitting intense and short pulses of light that can ablate and/or vaporize at least one element or other matter from the sample 155. Interaction between the light pulses and the vaporized matter can create plasma (or a plasma plume) that can radiate light. In selected embodiments, the light source can comprise a nanometer pulsed laser system (or circuit). Exemplary nanometer pulsed laser systems can include, but are not limited to a diode-pumped solid state (DPSS) pulsed laser system and/or a polarization-maintaining (PM) optical fiber pulsed laser system.

The nanometer pulsed laser system, for example, can include a fundamental wavelength of one thousand and sixty-four nanometers with multiple longitudinal modes, a maximum spectral line width FWHM (or full width at half maximum) of one-half nanometer, average output power of three hundred milliwatts, and/or an internal thermoelectrically-cooled (or TEC) module for temperature stabilization, without limitation. The laser pulse energy can be twenty-five millijoules, the laser pulse width can be between three nanoseconds and five nanoseconds, and/or the repetition rate can range from one hertz to fifty hertz. Additionally and/or alternatively, the laser pulse can be guided and/or focused at a surface of the target sample 155 by a plano-convex quartz lens (not shown) and a focusing lens (not shown) to form a high-temperature plasma for vaporization and atomization of the target material.

A fused-silica fiber-optic cable (not shown) can be mounted at about a forty-five degree angle relative to a predetermined surface of the target sample 155. The light released from the plasma containing the emission spectrum can be delivered by the fiber-optic cable to a spectrometer system (or circuit) (not shown), which can be connected to an intensified charged coupled detector. The image capturing subsystem 111 can be configured to record the emission lines and allow identification of the elements through their unique spectral signatures. In selected embodiments, the spectrometer can cover a wavelength range of between one hundred and ninety nanometers and one thousand and one hundred nanometers, including the spectral lines of almost all of the elements.

By radiating the radiated light, the plasma plume can comprise one or more external light source-induced excited plasma sources (not shown). The plasma plume can achieve a predetermined high plasma temperature, and the light source-induced excited plasma sources can allow a specific optical response resulting from the electronic relaxation of atoms and ions excited by the predetermined high plasma temperature to be elicited from the matter constituting the sample 155. The light source-induced excited plasma sources can be generated at different positions on a surface of the sample 155 with a predefined sequence covering a region of interest. Radiating the radiated light on the sample 155, in turn, can lead to emission and/or dissipation of certain amount of heat by the sample 155 itself, and the emitted heat can be compensated by quantifying self-absorption of resonance lines to calculate columnar densities.

The image capturing device 111B can include one or more camera devices (or circuits) (not shown) for capturing high-resolution still and/or video images of the sample 155. The images, for example, can comprise a sequence of image frames that can be presented with predetermined image timing, such as at a predetermined frame rate. In selected embodiments, the image capturing device 111B can comprise a high-resolution image sensor device (or circuit). Exemplary high-resolution image sensor devices can include, but are not limited to, a complementary metal-oxide semiconductor (CMOS) module (or circuit) and/or a charge coupled device (CCD) module (or circuit).

The image capturing device 111B can be activated in any suitable manner. Turning to FIG. 4C, for example, the MECS apparatus 100 is shown as including a triggering system (or circuit) 119 for activating the image capturing device 111B. The triggering system 119 can disposed adjacent to the image capturing device 111B and can be configured to provide a trigger signal to the image capturing device 111B. The triggering system 119, for example, can be disposed above, below and/or beside the image capturing device 111B. The triggering system 119 can disposed adjacent to the image capturing device 111B can receive the trigger signal and can be activated via the received trigger signal.

Returning to FIG. 4B, the light receiving device 111C can be configured to detect light emitted from the element(s) or other matter from the sample 155. The light receiving device 111C, for example, can detect the light from the light emitting device 111A that traverses the sample 155. If the sample 155 is disposed in the optional sample chamber 150 as shown in FIG. 4B, the light receiving device 111C can detect the light emitted from the element(s) or other matter from the sample 155 within the sample chamber 150. The light receiving device 111C can comprise one or more light collection and transmission lines (not shown) that can be adjusted from among different angles and/or geometries to achieve maximum light collection.

The light receiving device 111C can be provided in any suitable manner. The light receiving device 111C, for example, can comprise suitable logic, interfaces, and/or code. In selected embodiments, the light receiving device 111C can be optically optimized to detect only selected wavelengths (or selected ranges of wavelengths) of light intensity. The selected wavelengths can include, but are not limited to, a light wavelength between one hundred nanometers (100 nm) and five hundred nanometers (500 nm), a red wavelength between six hundred and twenty nanometers (620 nm) and seven hundred nanometers (700 nm), and/or an infrared (or IR) wavelength between seven hundred and eighty nanometers (780 nm) and one millimeter (1 mm). The light receiving device 111C can receive the variable wavelengths of light with a reception rate of one hundred milliseconds per each pulse, and the frequency of the reception rate can vary between ten times per second and twenty times per second. The light receiving device 111C can filter out unwanted light noise and/or can receive a ratio of the light, which can be a predetermined percentage of the wavelength of emitted light.

Figure 4B:
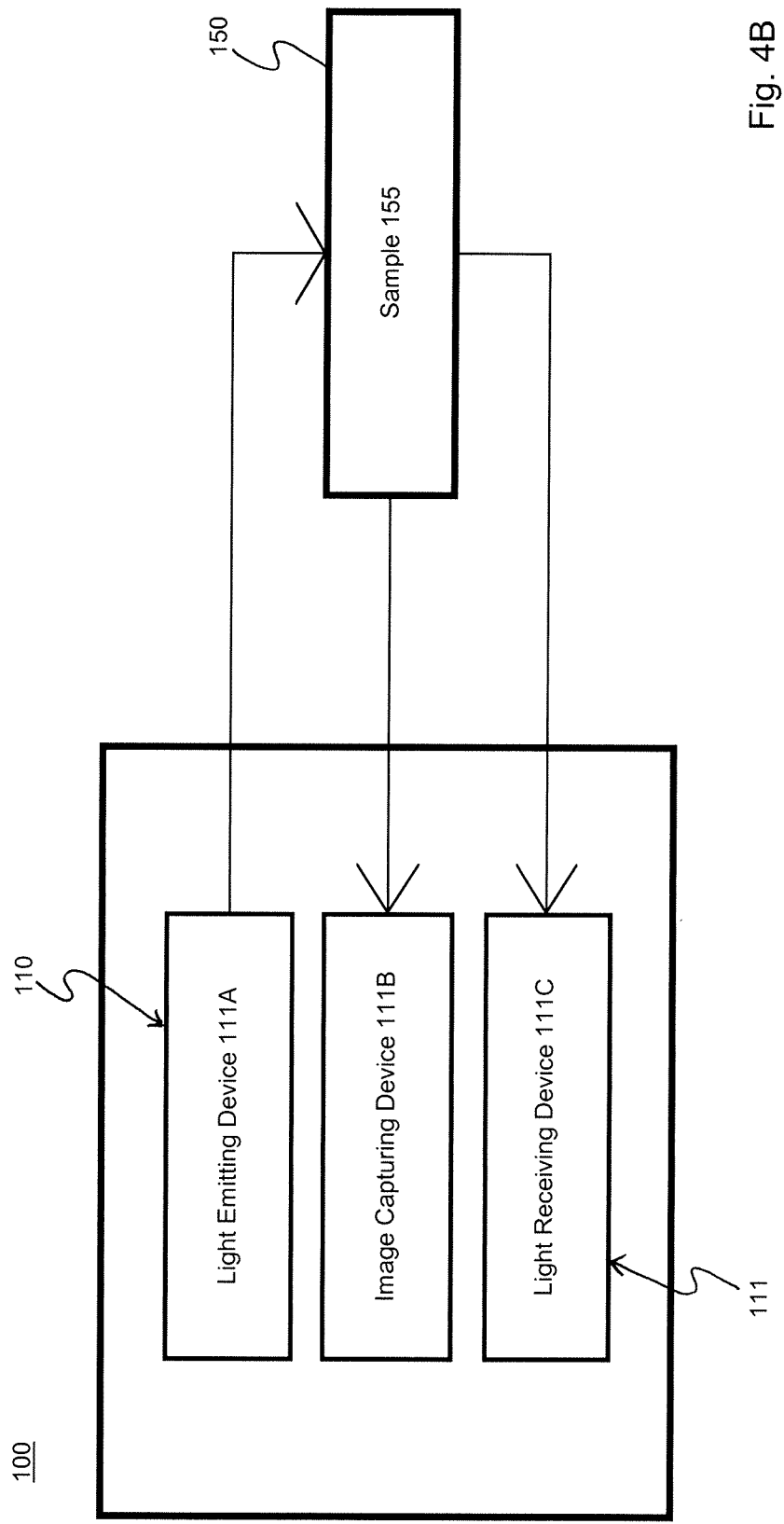
FIG. 4B is a detail drawing illustrating an exemplary alternative embodiment of the MECS apparatus of FIG. 4A, wherein the image capturing subsystem comprises a light emitting device, an image capturing device and a light receiving device.

As illustrated in FIG. 4B, the MECS apparatus 100 can include a wavelength conversion subsystem (or circuit) 112. The wavelength conversion subsystem 112 advantageously can convert the optical signal received from the light receiving device 111C (shown in FIG. 4C) of the image capturing system 111 with one wavelength to another optical signal. The wavelength conversion subsystem 112 can be implemented via a wavelength-division multiplexing (or WDM) network (or circuit).

Wavelength conversion subsystems 112 can be associated with one or more categories of wavelength conversion subsystems. The wavelength conversion subsystem categories, for example, can be based on input and output wavelength handling limits of the wavelength conversion subsystems 112. Exemplary wavelength conversion subsystem categories can include, but are not limited to, wavelength conversion subsystems with a fixed input and a fixed output, wavelength conversion subsystems with a variable input and a fixed output, wavelength conversion subsystems with a fixed input and a variable output and/or wavelength conversion subsystems with a variable input and a variable output.

A wavelength conversion subsystem 112 with a fixed input and a fixed output can convert a fixed wavelength signal into a fixed wavelength output signal. A wavelength conversion subsystem 112 with a variable input and a fixed output can convert an arbitrary wavelength into a fixed wavelength output signal. A wavelength conversion subsystem 112 with a fixed input and a variable output can convert a fixed wavelength signal into a variable output signal with a variety of wavelengths. A wavelength conversion subsystem 112 with a variable input and a variable output can convert a variable wavelength signal input into a variable output signal.

The MECS apparatus 100 optionally can include a pulse width modulation subsystem (or circuit) 113. The pulse width modulation subsystem 113 can be configured for reducing an average power delivered by an electrical signal by effectively dividing the electrical signal into discrete signal parts. An average value of voltage fed to a load, for example, can be controlled by alternately coupling and decoupling a voltage source and the load at a fast rate. In selected embodiments the subsystem of the MECS apparatus 100 can be modulated or otherwise controlled via the processing system 120 (shown in FIG. 3) using the instructions, calibration data and other data stored in, and provided to the processing system 120 by, the memory system 130 (shown in FIG. 3).

The MECS apparatus 100 of FIG. 4A is illustrated as including a clock extraction subsystem (or circuit) 114. The clock extraction subsystem 114 can provide a right sampling phase to the light emitting device 111A (shown in FIG. 4C) of the image capturing system 111. The right sampling phase can be determined by an exposure time of between one nanosecond and ten nanoseconds of the image capturing subsystem 111. In selected embodiments, the clock extraction subsystem 114 can extract timing information from a serial data stream, allowing timing of the information in the light stream to be accurately determined without separate clock information.

Time stamps of the selected MECS subsystems 110, for example, can be recorded with the information of each selected MECS subsystem 110. More specifically, time stamps for the image capturing subsystem 111, the wavelength conversion subsystem 112, the pulse width modulation subsystem 113, the light pulse control subsystem 115 and/or the plasma temperature subsystem 118 can be recorded with the relevant subsystem information of each subsystem for a twenty-one millijoule pulse of 3.6 nanosecond duration at 1064 nanometers with a repetition rate of 0.33 Hertz at 12.5 millimeter focal length at four hundred degrees Celsius. The times stamps and other recorded data can provide a typical signature for qualitative and/or quantitative data for a particular tested sample 155, such as a potato leaf.

The qualitative and/or quantitative data of the tested sample 155 at an accredited laboratory and/or recorded by the MECS apparatus 100 can be recorded and/or added as calibration models in the memory system 130. Additionally and/or alternatively, similar qualitative and quantitative data for the similar test samples 155, such as a potato leaf, from the National Institute of Standard and Technology (NIST) for libs technology database can be captured and stored in the memory system 130 for reference. The captured signature can be compared with calibration models, such as signatures provided by the accredited laboratory and/or the NIST libs technology database, stored in the memory system 130 and processed via the processing system 120 with resultant qualitative and quantitate data being generated for the particular sample 155.

The clock extraction subsystem 114 likewise can supply timing to a phase-locked loop (PLL) (not shown), which can control a clock for the recovered upstream information. The recovered upstream information can include, but is not limited to, qualitative and quantitative data of the samples 155 tested at an accredited laboratory and/or recorded by the MECS apparatus 100. In selected embodiments, the recovered upstream information can be stored as calibration models in the memory system 130. Additionally and/or alternatively, similar qualitative and quantitative data for the similar samples from the National Institute of Standard and Technology (NIST) for libs technology database can be captured and/or stored in the memory system 130 for reference.

Additionally and/or alternatively, the clock extraction subsystem 114 can be integrated with plasma-produced light exposure synchronization via the sequence of image frames and predetermined image timing provided by the image capturing device 111B and the light received by the light receiving device 111C.

An optional light pulse control subsystem (or circuit) 115 of the MECS apparatus 100 can convert input from a temperature controller or a computer to a time proportional output.

As illustrated in FIG. 4A, the MECS apparatus 100 can include a time synchronization subsystem (or circuit) 116 can provide Precision Time Protocol and/or Network Time Protocol (or NTP) services. The time synchronization subsystem 116 can distribute time across clocks in a network to achieve phase synchronization. A clock of the time synchronization subsystem 116 advantageously can be maintained by using a radio clock or other accurate time source to enable time synchronized in real-time.

A time calibration subsystem (or circuit) 117 of the MECS apparatus 100 can calibrate in real-time, heterogeneity, analysis times, instrument stability during analyses, protective thin films, sample thickness, sample width, analyte interferences, detector resolution, power source fluctuations, instrumental drift, moisture, and/or water content. In selected embodiments, the time calibration subsystem 117 can calibrate one or more sensors associated with the MECS apparatus 100. The sample chamber 150 (shown in FIG. 1B) can be made of a standard reference material, such as SAE 304 stainless steel (or SS304). The standard reference material can have a predetermined element composition. For SAE 304 stainless steel. The predetermined element composition can comprise a known element composition of C (0.07%), Cr (17.50%), Mn (2%), Si (1%), P (0.045%), S (0.015 ppm), Ni (9%) N, (0.10%) Fe (balance).

The sensors associated with the MECS apparatus 100 can capture a spectra of the standard reference material every time before a sample 155 is placed in the sample chamber 150, and the time calibration subsystem 117 can check for any deviation. If the deviation is within a predetermined selectable threshold, such as five percent, the sensors can allow the sample 155 to be measured. If deviation is outside of the predetermined selectable threshold, the time calibration subsystem 117 can issue an alert to take corrective action.

Figure 4C:
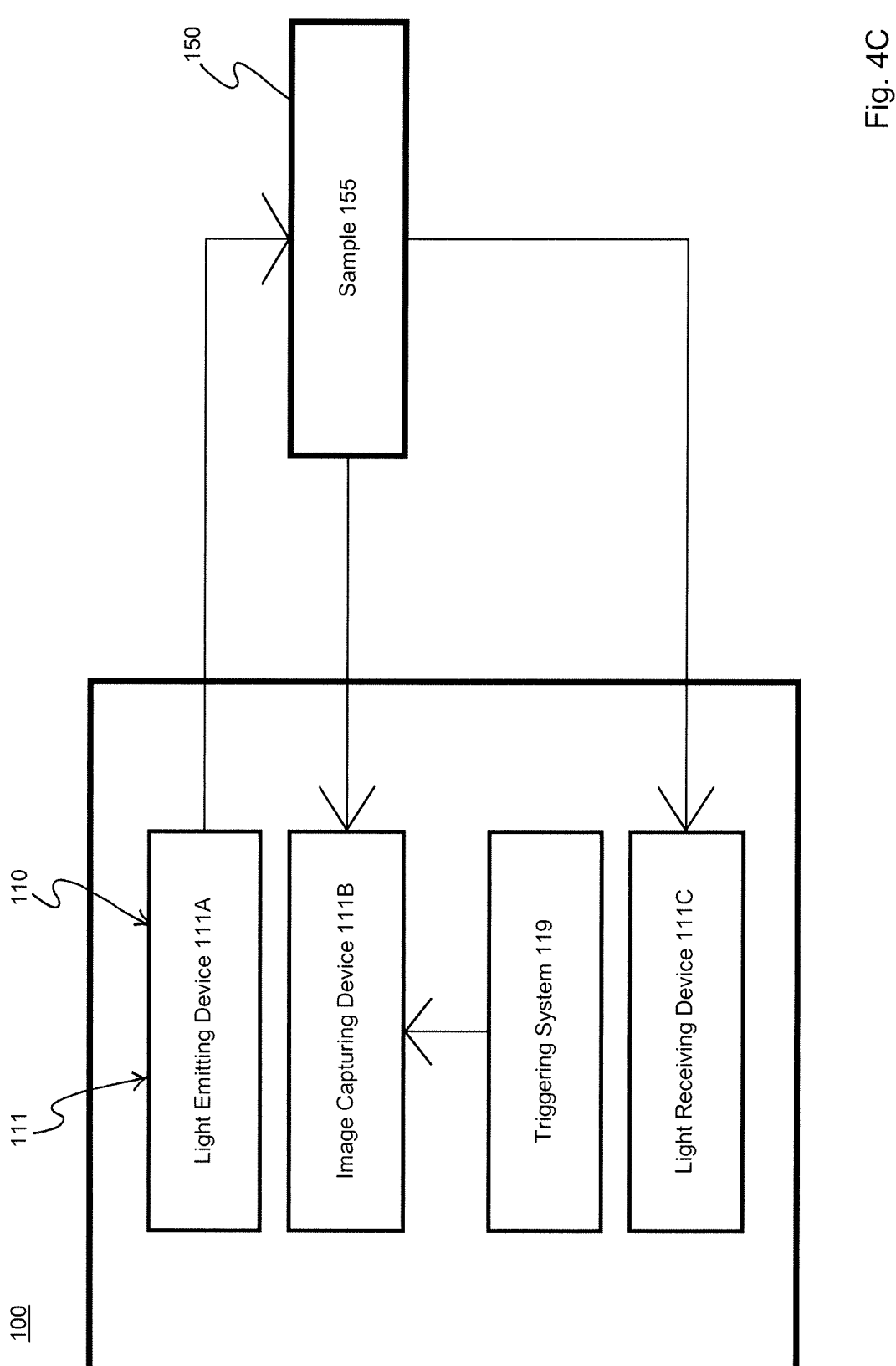
FIG. 4C is a detail drawing illustrating another exemplary alternative embodiment of the MECS apparatus of FIG. 4A, wherein the MECS apparatus includes a triggering system for activating the image capturing device.

Additionally and/or alternatively, the MECS apparatus 100 can include a plasma temperature subsystem (or circuit) 118 for determining the plasma temperature of the one or more external light source-induced excited plasma sources discussed herein with reference to FIG. 4C. The plasma temperature can comprise a condition under which the measurement of element concentration of the sample 155 can be performed. Ablation of the sample 155 can happen at one or more different plasma temperatures, such as a plasma temperature within a range between four hundred degrees Celsius and eight hundred degrees Celsius. Multiple light spectra can be captured via a spectrometer system (or circuit) (not shown). The sensors associated with the MECS apparatus 100 can choose a selected spectra captured at a predetermined plasma temperature, such as a predetermined plasma temperature of eight hundred degrees Celsius, and compare the captured spectra with spectra data captured at the predetermined plasma temperature in the NIST database for the same type of sample 155. In selected embodiments, spectra captured at different plasma temperatures may not be suitable for comparison to carry out qualitative and quantitative element estimation.

In selected embodiments, the MECS apparatus 100 can quantify the self-absorption of resonance lines to calculate the columnar densities as set forth above with reference to FIG. 4C. The MECS apparatus 100 likewise can make one or more plasma emission measurements at different gate delay times, map excitation temperature for each delay and/or calibrate to produce stable elemental analysis, the characterization and/or other measurement data for the sample 155. A spectral signature of data from the plasma-emitted light advantageously can be processed and analyzed in real-time. The processed data can be compared with existing data on the specific element signature based on the soil/leaf/seed/material sample.

If the sample 155 comprises a potato leaf with a mass of three grams, for example, the sample 155 can be prepared or otherwise initialized in the manner discussed in more detail herein with reference to FIGS. 11, 12 and 13A-B. The sample 155 can be disposed in the sample preparation (or initialization) device 160 (shown in FIG. 12). The sample preparation device 160 can dry and/or compress the sample 155 under a preselected pressure for predetermined period of time. Exemplary preselected pressures can include mechanical pressures within a range between one hundred and fifty megapascal and three hundred megapascal, and an exemplary predetermined period of time can comprise ten seconds, without limitation. The sample 155 thereby can be formed into a dried pellet with a size, shape or other dimension. The dried pellet, for instance, can have a diameter of ten millimeters and/or a thickness within a range between one millimeter and three millimeters. In selected embodiments, a dried pellet can be prepared for each sample 155.

One or more of the pellets can be placed in a sample chamber 150 (shown in FIG. 1B) for MECS analysis. In selected embodiments, the sample chamber 150 can comprise a rotating sample chamber or can otherwise rotate the pellets to provide a fresh surface for every laser shot. The sample chamber 150, for instance, can constantly rotate the pellets. Based on a preliminary study, a repetition rate, a delay time and/or a pulse gate width can be established for the image capturing subsystem 111. The repetition rate, the delay time and/or the pulse gate width of the image capturing subsystem 111, for example, can be set to ten Hertz, one microsecond and/or twenty microseconds, respectively.

Alignment of the optics and calibration of the image capturing subsystem 111 can be accomplished by maximizing an intensity and minimizing a shift of the emission lines for one or more elements. Exemplary elements with their respective spectral lines can include, but are not limited to, nitrogen (742.36 nm), phosphorus (213.62 nm), magnesium (516.73 nm), calcium (526.22 nm), boron (249.77 nm), copper (324.75 nm), iron (382.78 nm), manganese (279.48 nm), zinc (472.21 nm) and/or total organic carbon (193.03 nm). The calibration of the image capturing subsystem 111 can be deemed to be adequate if the wavelength error of all the major emission lines is less than one half of one percent.

One or more spectra can be collected for each sample 155, and each spectrum can comprise an average of a predetermined number of laser shots. For example, twenty spectra can be collected for a selected sample 155 with each spectrum comprising an average of one hundred laser shots. The measurements preferably are conducted at the same time at a predetermined atmospheric air pressure, such as an air pressure in a laboratory. In selected embodiments, elemental spectral lines can be identified according to the most frequently used spectral lines in the previously published literature and/or can be confirmed using the NIST atomic spectra database. Once an element is identified for the selected sample 155 and the emission line used for the quantitative analysis (up to ten thousand parts per million) is captured or otherwise decided, a background-subtracted intensity of each spectral peak can be determined.

Although shown and described with reference to FIG. 4A as comprising selected MECS subsystems 111-118 for purposes of illustration only, the MECS apparatus 100 can include any predetermined number, type and/or configuration of MECS subsystems 110 without limitation.

Figure 5A:
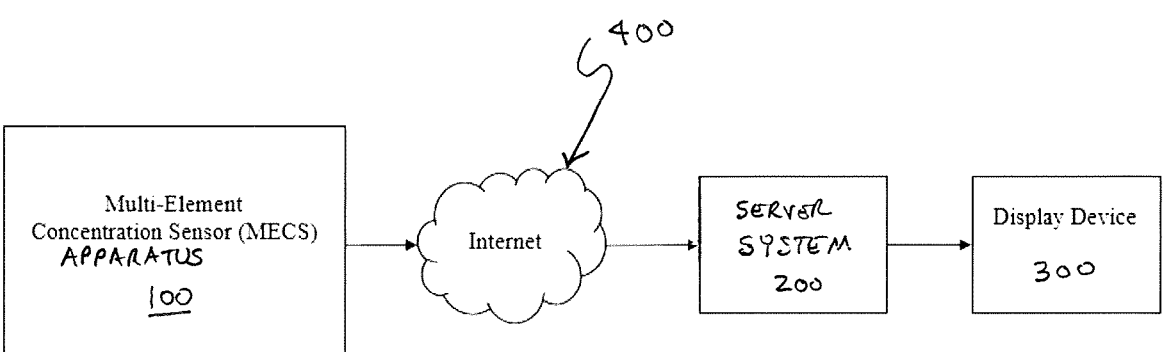
FIG. 5A is a top-level block diagram illustrating an exemplary embodiment of a multi-element concentration sensor (MECS) system for performing multi-element analysis on a sample, wherein the MECS system includes a server system and the MECS apparatus of FIGS. 1A-B, 2, 3 and 4A-C.

Turning to FIG. 5A, the MECS apparatus 100 advantageously can be incorporated into a multi-element concentration sensor (MECS) system 1000 for performing the multi-element quantitative and/or qualitative analysis on the sample 155 (shown in FIG. 1A). The MECS apparatus 100 can be provided in the manner set forth above with reference to FIGS. 1A-B, 2, 3 and 4A-C for performing the multi-element quantitative and/or qualitative analysis on the sample 155.

The MECS system 1000 is shown as including a server system (or circuit) 200. The server system 200 can be distal to, or proximal from, the MECS system 1000. In selected embodiments, the MECS apparatus 100 can be configured to perform the elemental analysis of the sample 155 and to provide analysis results of the elemental analysis to the server system 200 for further processing. The MECS apparatus 100 can provide the analysis results to the server system 200 in any suitable manner, including directly and/or indirectly, such as via the Internet 400, as shown in FIG. 5A. The server system 200 can be configured to provide on-demand access to computing resources, applications, servers, data storage, development tools, networking capabilities, and more hosted, for example, at a remote data center (not shown). The server system 200 can comprise, but is not limited to, a cloud computing system comprising one or more models that analyze the output results received from the MECS apparatus 100.

Figure 5B:
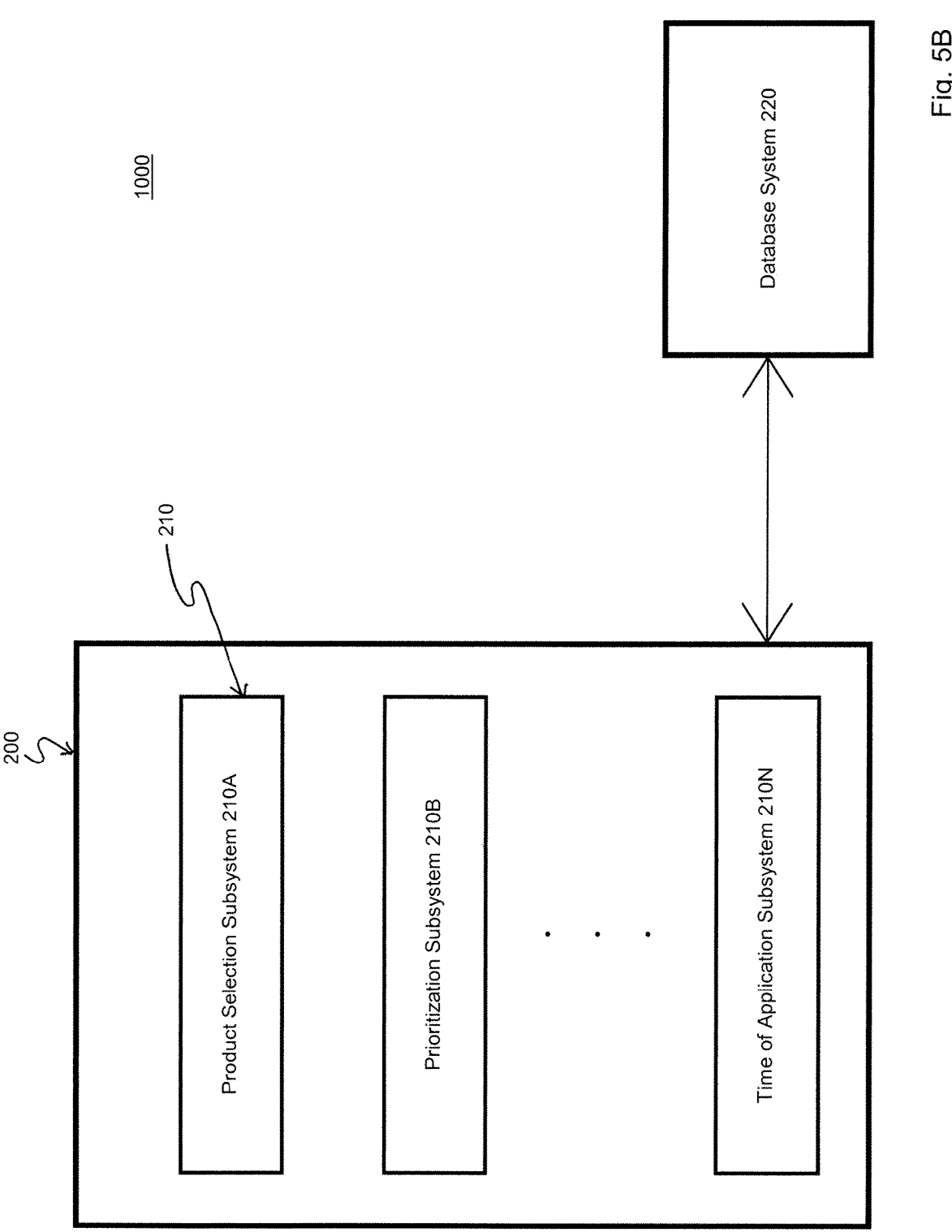
FIG. 5B is a top-level block diagram illustrating an exemplary alternative embodiment of the MECS system of FIG. 5A, wherein the server system is configured to communicate with a database system.

In selected embodiments, the server system 200 can be configured to derive sample-specific recommendations by analyzing the analysis results provided by the MECS apparatus 100. The server system 200 can analyze the analysis results in any suitable manner, such as, for example, by utilizing one or more reference models. To provide sample-specific recommendations, the server system 200 can be configured to operate on a rule-based logic that can identify one or more database entries from a database system (or circuit) 220, such as an expert database system, as illustrated in FIG. 5B. The database entries can include, but are not limited, to nutritional amendment information, including specific products, application rates, and application intervals intended to restore nutrient levels of the soil, plant, matter or other materials to desired values. The expert database system 220 can comprise a plurality of entries, wherein at least some entries can be associated with a particular nutrient product and/or indicate nutrient supplement regimens for each associated product.

The server system 200 can be provided in any suitable manner. As shown in FIG. 5B, for example, the server system 200 can comprise one or more server subsystems 210. The server system 200, in other words, can comprise a predetermined number of server subsystems 210 each being associated with respective functions that the server system 200 can be configured to perform. The server system 200 can comprise uniform and/or different server subsystems 120.

Stated somewhat differently, the server system 200 can include two or more identical server subsystems 210 and/or two or more different server subsystems 210. A first function performed by a first server subsystem 210, for example, can be the same as a second function performed by a second server subsystem 210 and/or different from a third function performed by a third server subsystem 210.

In selected embodiments, the server system 200 can include a product selection (logic) subsystem (or circuit) 210A as illustrated in FIG. 5B. The product selection subsystem 210A can be configured for acting on current nutrient levels to identify shortfalls between current nutrient levels and desired nutrient levels and/or to identify entries in the expert database system 220 indicating regimens suitable to achieve the desired nutrient levels. An optional prioritization (logic) subsystem (or circuit) 210B can be configured to select one or more of the identified entries in the expert database system 220 to form a subset of entries that are suitable to achieve the desired nutrient levels of particular nutrients in favor of other nutrients. Additionally and/or alternatively, a time-of-application (logic) subsystem (or circuit) 210N can be configured to select one or more particular entries from the expert database system 220 based on plant-specific information that contraindicates the application of a nutrient during the current season.

Returning to FIG. 5A, the MECS system 1000 can include a display device (or circuit) 300. The display device 300 can be distal to, or proximal from, the MECS apparatus 100 and/or the server system 200. The display device 300 can communicate with the server system 200 and/or the MECS apparatus 100 in any suitable manner, including directly and/or indirectly, such as via the Internet 400.

In selected embodiments, the server system 200 can be configured to provide the derived sample-specific recommendations to the display device 300 for final assessment and presentation to a user (not shown). The sample-specific recommendations provided to the display device 300 can include, but are not limited to, the content of plant matter, the content of soil, the content of fertilizers, soil amendments, and/or types of pesticides.

The display device 300 may be implemented using any device capable of wireless communication, including, but not limited to, a cellular telephone, computer, server, router, laptop, tablet, wearable device, watch, appliance, automobile or airplane. In selected embodiments, the display device 300 can be configured to communicate using a predetermined protocol for wireless communication. Hardware, firmware and/or software display device 300, for example, can be configured to communicate using the predetermined protocol. Exemplary wireless communication protocols can include, but are not limited to Bluetooth Low Energy, Bluetooth Smart, Wireless Fidelity (or Wi-Fi), code-division multiple access (or CDMA) and/or time-division multiple access (or TDMA).

The display device 300 can receive the derived sample-specific recommendations and other communications from the server system 200 in real-time and/or in a time-delayed manner. Transmitted signals from the server system 200 can be formatted in accordance with a wireless communication protocol expected by the display device 300. The transmitted signals, for example, can comprise a backscatter signal. Exemplary backscatter signals can include a Bluetooth signal (e.g., such as an advertising packet), a Wi-Fi signal (e.g., such as a beacon frame), and/or a ZigBee signal, without limitation. For example, the backscatter signal may be a beacon frame in accordance with IEEE 802.15.4. Advantageously, no additional software, firmware, or hardware may be needed for the display device 300 to receive and decode the transmitted backscatter signal for enabling the display device 300 to receive and decode signals that are formatted in accordance with the wireless communication protocol and that are received from other sources.

Figure 6:
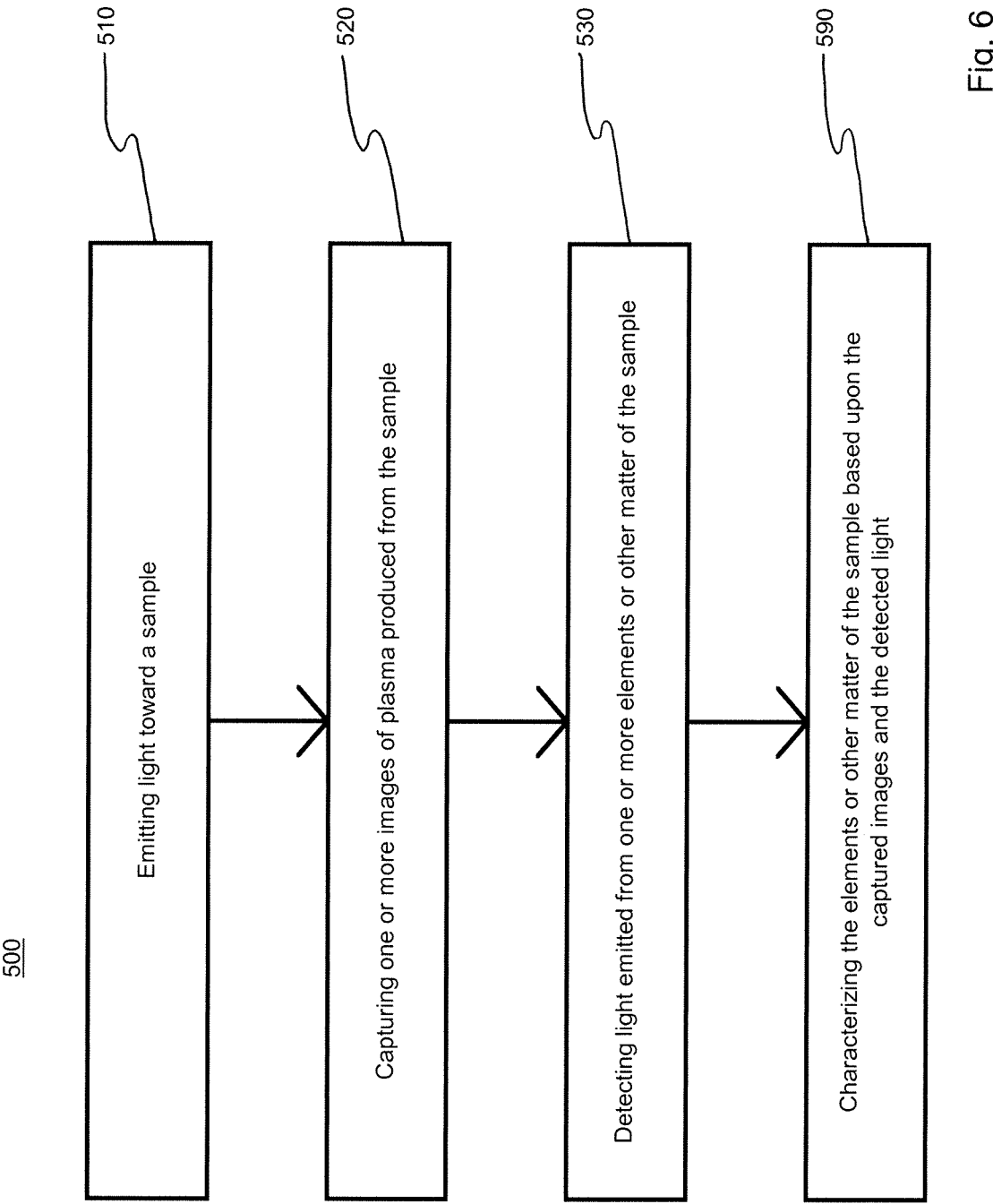
FIG. 6 is a top-level flow chart illustrating an exemplary embodiment of a multi-element concentration sensor (MECS) method for performing multi-element analysis on a sample.

FIG. 6 illustrates an exemplary multi-element concentration sensor (MECS) method 500 for performing multi-element analysis on a sample 155 (shown in FIG. 1A). In selected embodiments, the MECS apparatus 100 (shown in FIG. 1A) can be configured to perform the MECS method 500 to perform the multi-element analysis on the sample 155. Turning to FIG. 6, the MECS method can include, at 510, emitting light toward a sample 155 (shown in FIG. 1A). The light can be emitted, at 510, via the light emitting device 111A (shown in FIG. 4B) in selected embodiments.

The emitted light can include a variable optical capability that can control a wavelengths, an intensity and/or a power of the emitted light. Additionally and/or alternatively, the light can be emitted, at 510, as intense and short pulses of light that can ablate and/or vaporize at least one element or other matter from the sample 155. The emitted light, in selected embodiments, can be provided with a light wavelength range between one hundred and ninety nanometers and one thousand and one hundred nanometers with a fundamental wavelength of one thousand and sixty-four nanometers with multiple longitudinal modes, a maximum spectral line width FWHM (or full width at half maximum) of one-half nanometer, an average output power of three hundred milliwatts, and/or an internal thermoelectrically-cooled (or TEC) module for temperature stabilization, without limitation. If the light source comprises a pulsed laser system, for example, the emitted light can have a light pulse energy of about twenty-five millijoules, a laser pulse width of between three nanoseconds and five nanoseconds, and/or a repetition rate between one Hertz and fifty Hertz. Interaction between the light pulses and the vaporized matter can create plasma (or a plasma plume) that can radiate light.

In the manner discussed in more detail above with reference to FIG. 4B, the plasma plume can comprise one or more external light source-induced excited plasma sources (not shown). The plasma plume can achieve a predetermined high plasma temperature, and the light source-induced excited plasma sources can allow a specific optical response resulting from the electronic relaxation of atoms and ions excited by the predetermined high plasma temperature to be elicited from the matter constituting the sample 155. The light source-induced excited plasma sources can be generated at different positions on a surface of the sample 155 with a predefined sequence covering a region of interest. Radiating the radiated light on the sample 155, in turn, can lead to emission and/or dissipation of certain amount of heat by the sample 155 itself, and the emitted heat can be compensated by quantifying self-absorption of resonance lines to calculate columnar densities.

One or more images of the plasma produced from the sample 155 can be captured, at 520. The captured images can include high-resolution still images and/or video images of the plasma and/or can be captured during ablation and/or vaporization of at least one element or other matter from the sample 155. In selected embodiments, the captured images can comprise a sequence of image frames that can be presented with predetermined image timing, such as at a predetermined frame rate.

The MECS method 500 can include detecting light emitted from one or more elements or other matter of the sample 155, at 530. In selected embodiments, discrete wavelengths of the emitted light can be detected. The MECS method 500, in other words, can be optically optimized to detect only selected wavelengths (or selected ranges of wavelengths) of light intensity, at 530. The selected wavelengths can include, but are not limited to, a light wavelength between one hundred nanometers (100 nm) and five hundred nanometers (500 nm), a red wavelength between six hundred and twenty nanometers (620 nm) and seven hundred nanometers (700 nm), and/or an infrared (or IR) wavelength between seven hundred and eighty nanometers (780 nm) and one millimeter (1 mm). The variable wavelengths of light can be detected with a reception rate of one hundred milliseconds per each pulse, and a frequency of the reception rate can vary between ten times per second and twenty times per second. Advantageously, unwanted light noise can be filtered out and/or a ratio of the emitted light, which can be a predetermined percentage of the wavelength of the emitted light, can be detected.

The elements or other matter from the sample 155 can be characterized, at 590, based upon the captured images of the plasma produced from the sample 155 and/or the detected light emitted from one or more elements or other matter of the sample 155.

Figure 7A:
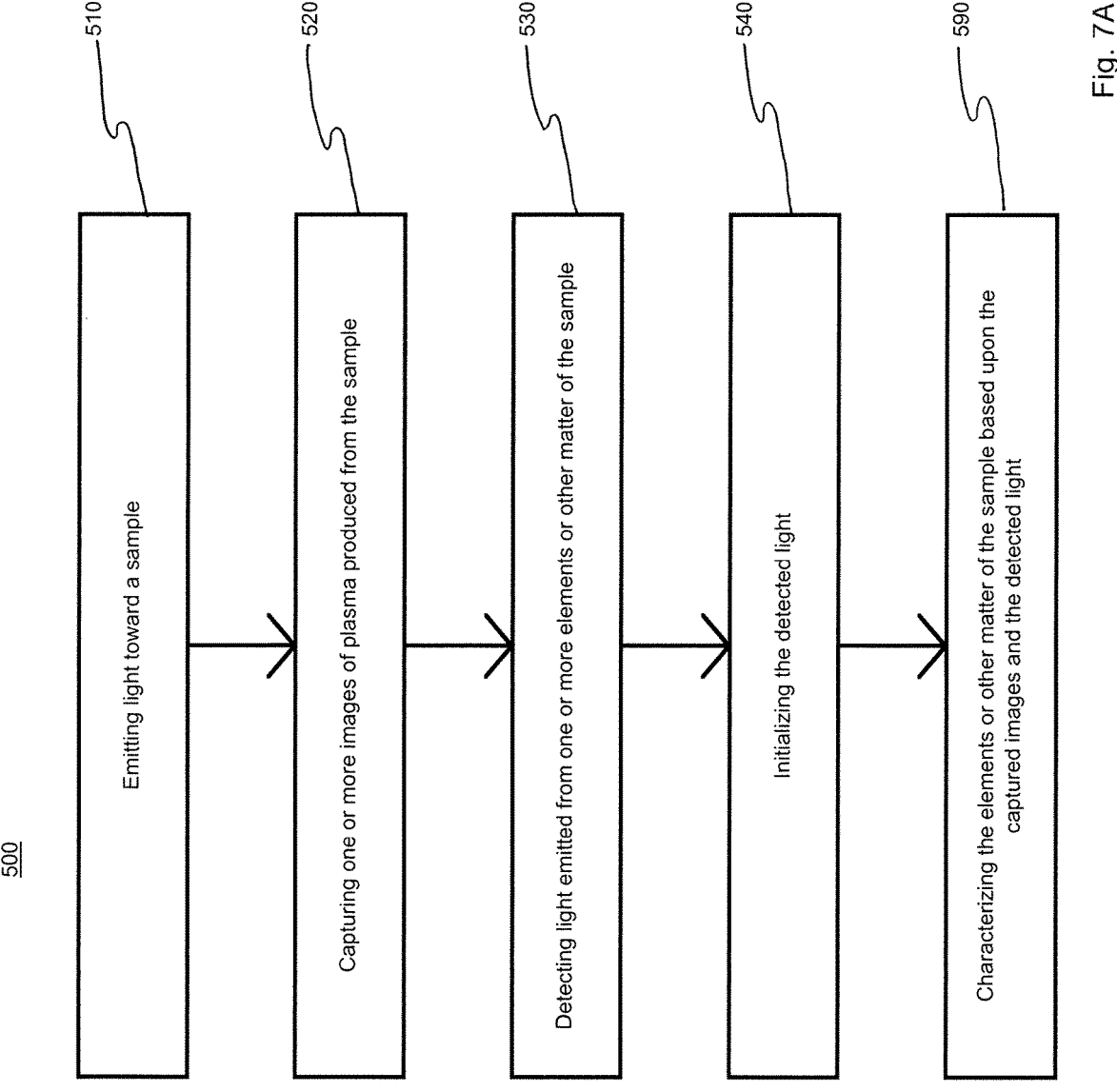
FIGS. 7A-C are top-level flow charts illustrating an exemplary alternative embodiment of the MECS method of FIG. 6, wherein the MECS method includes initializing detected light emitted from one or more elements or other matter of the sample.
Figure 7B:
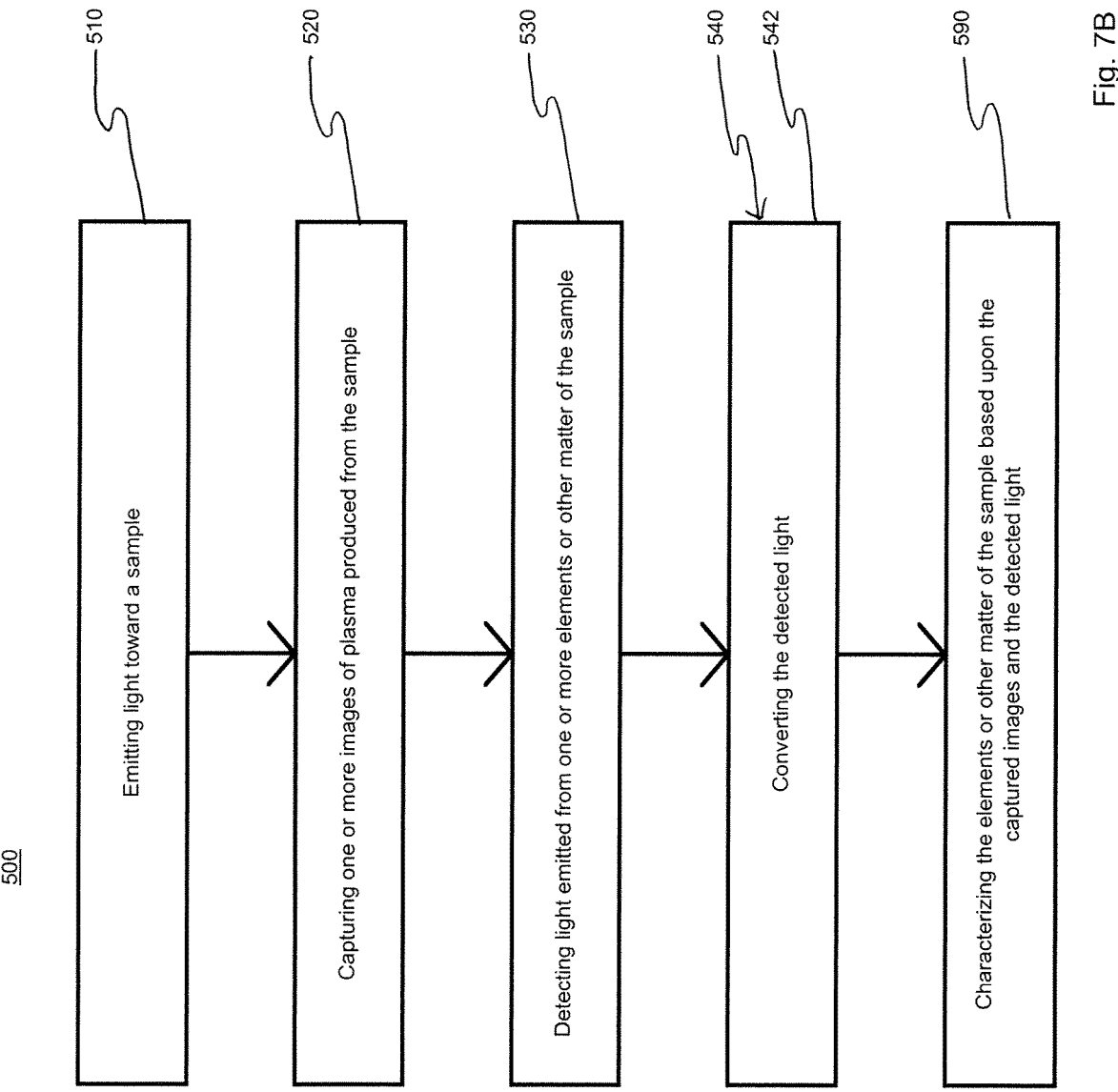
Figure 7C:
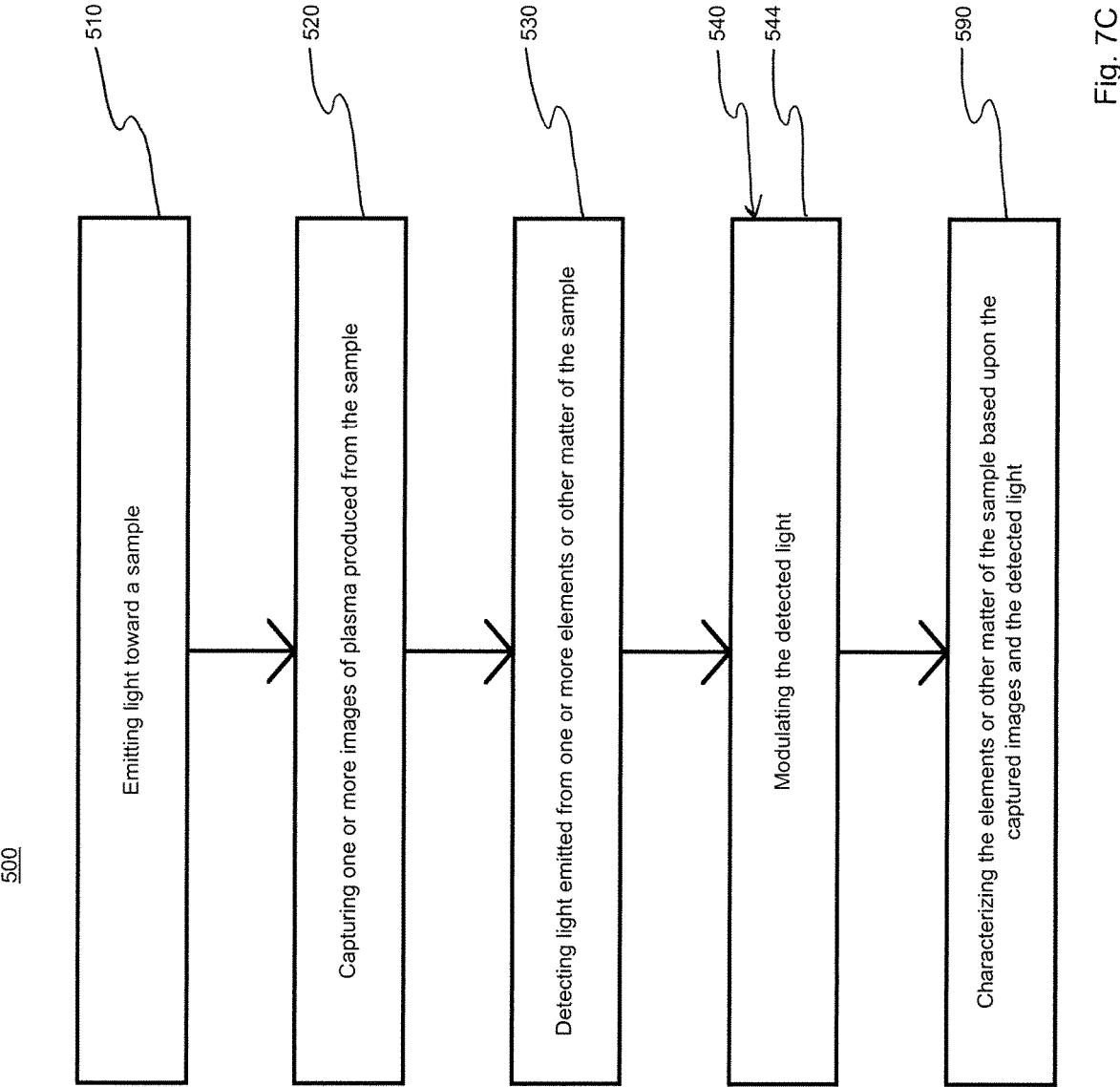

As shown in FIGS. 7A-C, the MECS method 500 optionally can include, at 540, initializing the detected light emitted from one or more elements or other matter of the sample 155 (shown in FIG. 1A). Turning to FIG. 7B, for example, the detected light emitted from one or more elements or other matter of the sample 155 can be initialized, 542, by converting the detected light to discrete wavelength bands and optionally suppressing any out-of-band background light noise. In selected embodiments, the MESC method 500, at 542, can convert the detected light with one wavelength to another optical signal. The MESC method 500, for example, can convert the detected light via wavelength-division multiplexing (or WDM).

Additionally and/or alternatively, the detected light emitted from one or more elements or other matter of the sample 155 can be initialized, 544, by modulating the detected light to reduce the average power delivered by an electrical signal as illustrated in FIG. 7C. Stated somewhat differently, the detected light can be modulated for reducing an average power delivered by an electrical signal by effectively dividing the electrical signal into discrete signal parts. An average value of voltage fed to a load, for example, can be controlled by alternately coupling and decoupling a voltage source and the load at a fast rate.

Figure 8:
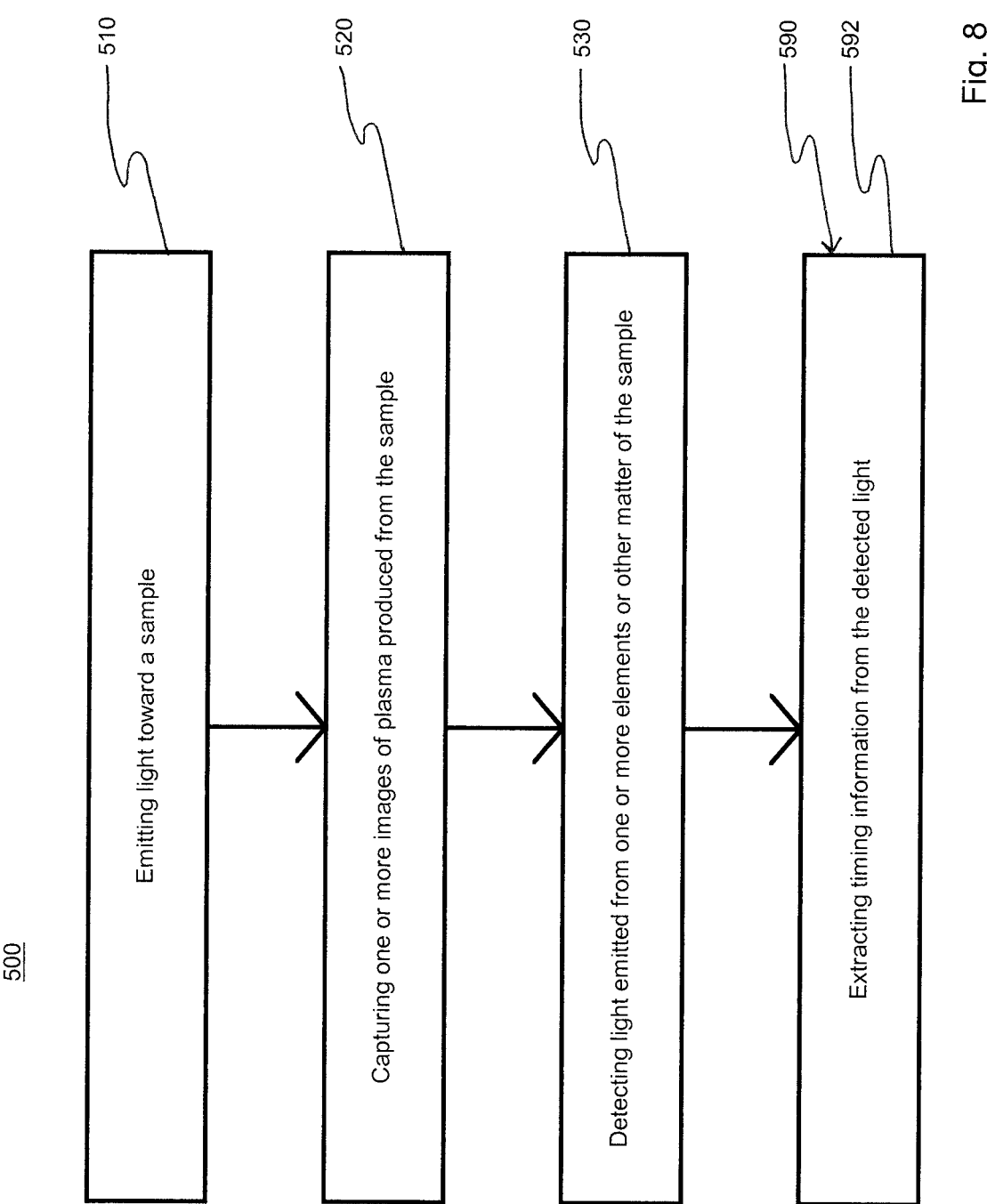
FIG. 8 is a top-level flow chart illustrating another exemplary alternative embodiment of the MECS method of FIG. 6, wherein the MECS method includes extracting timing information from the detected light emitted from the elements or other matter of the sample.

The MECS method 500 is shown in FIG. 8, as including, at 592, extracting timing information from the detected light emitted from the elements or other matter of the sample 155 (shown in FIG. 1A).

Figure 9A:
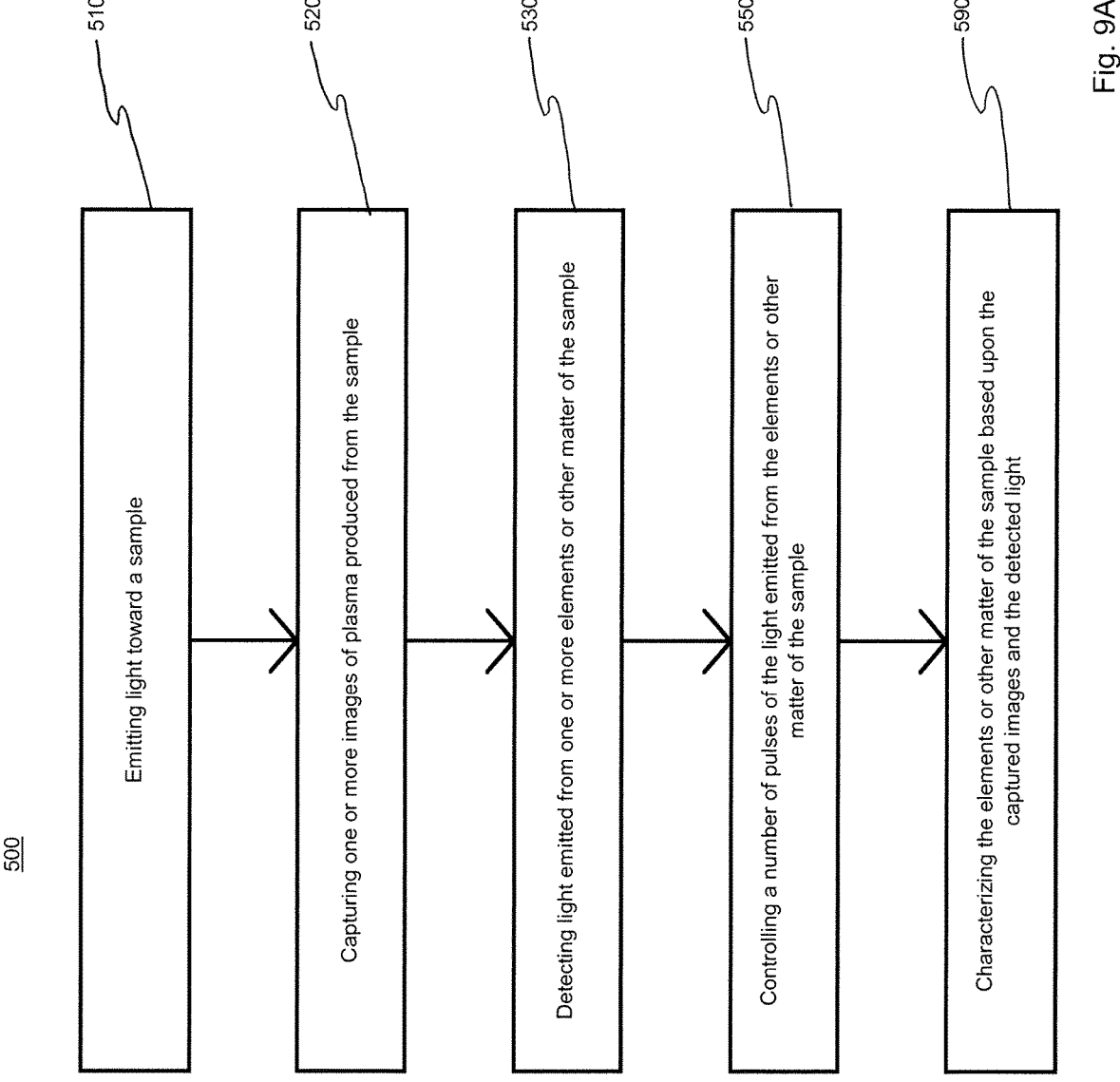
FIG. 9A is a top-level flow chart illustrating yet another exemplary alternative embodiment of the MECS method of FIG. 6, wherein the MECS method includes controlling a number of pulses of the light emitted from the elements or other matter of the sample.

Turning to FIG. 9A, the MECS method 500 optionally can include controlling a number of pulses of the light emitted from the elements or other matter of the sample 155 (shown in FIG. 1A), at 550.

Figure 9B:
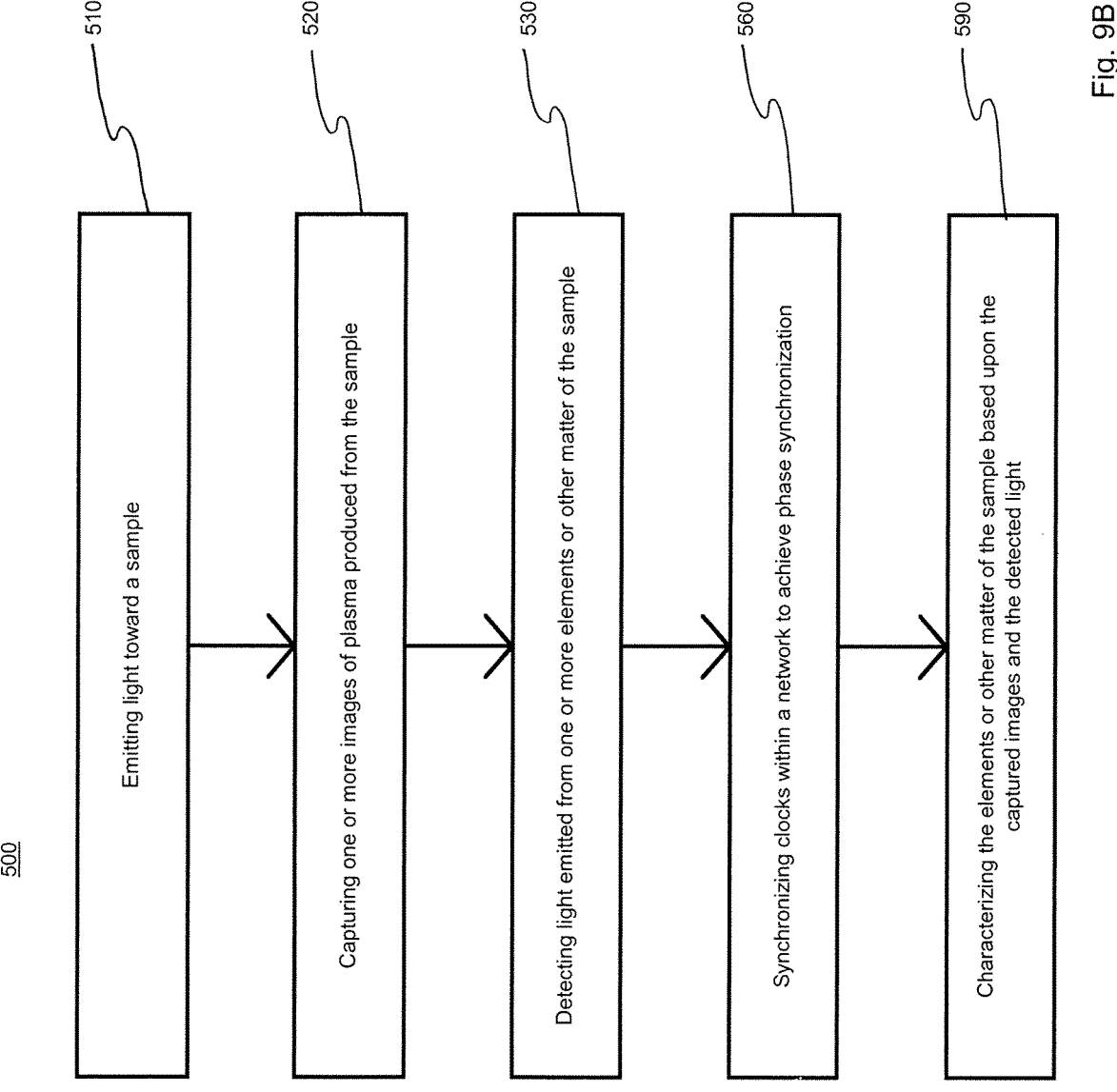
FIG. 9B is a top-level flow chart illustrating yet another exemplary alternative embodiment of the MECS method of FIG. 6, wherein the MECS method includes synchronizing clocks within a network to achieve phase synchronization.

Additionally and/or alternatively, the MECS method 500, at 560, can include synchronizing clocks within a network as illustrated in FIG. 9B. Stated somewhat differently, time can be distributed across clocks within the network. The clocks within the network advantageously can be synchronized to achieve phase synchronization. A clock can be maintained by using a radio clock or other accurate time source to enable time synchronized in real-time.

Figure 9C:
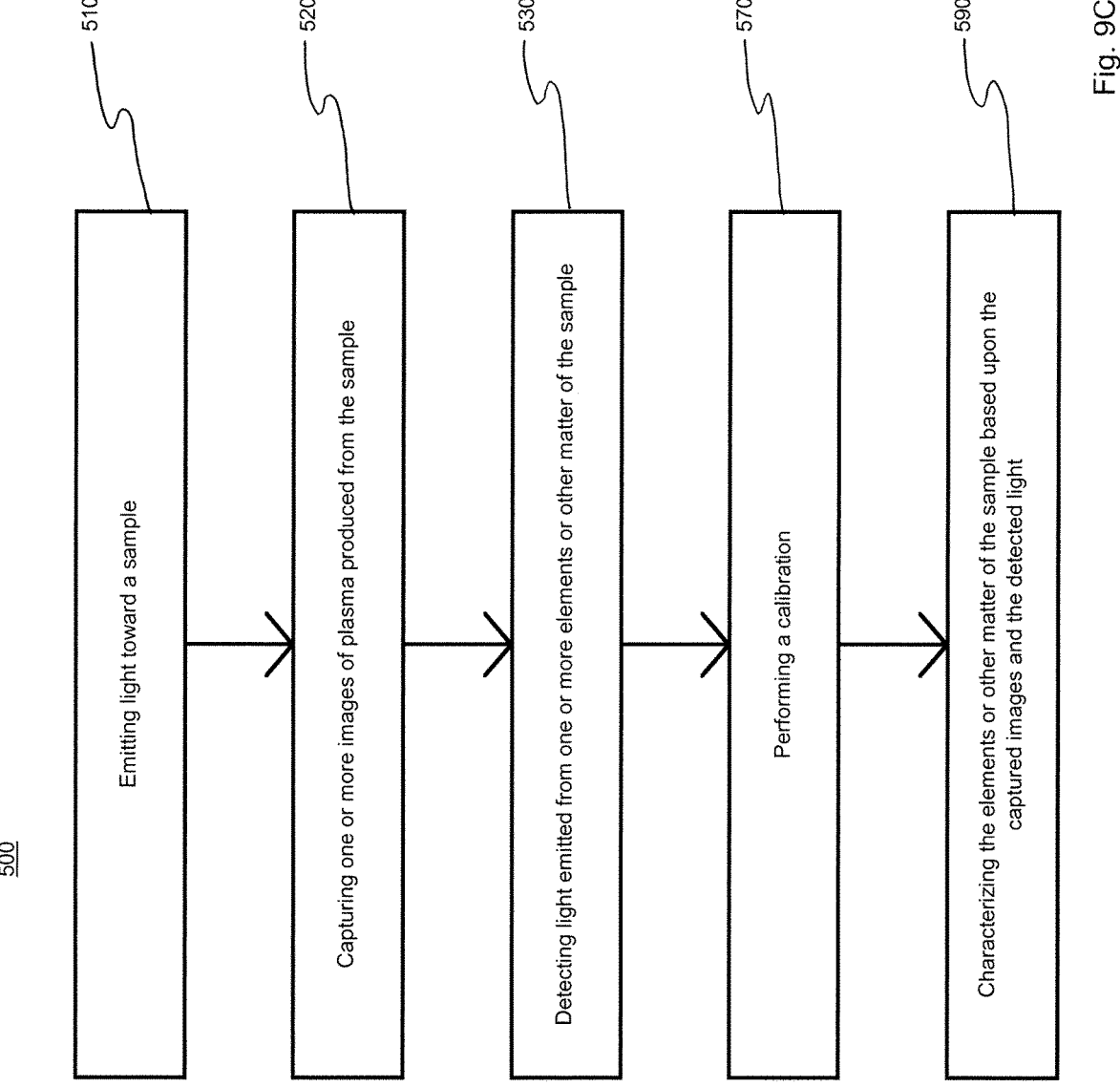
FIG. 9C is a top-level flow chart illustrating yet another exemplary alternative embodiment of the MECS method of FIG. 6, wherein the MECS method includes performing a calibration.

The MECS method 500 of FIG. 9C includes, at 570, preforming a calibration. Exemplary calibrations that can be performed, at 570, can include, but are not limited to, calibration of heterogeneity, analysis times, instrument stability during analyses, protective thin films, sample thickness, sample width, analyte interferences, detector resolution, power source fluctuations and instrumental drift, moisture and/or water content. The calibration can be formed in a real time manner and/or in a time-delayed manner.

Figure 10:
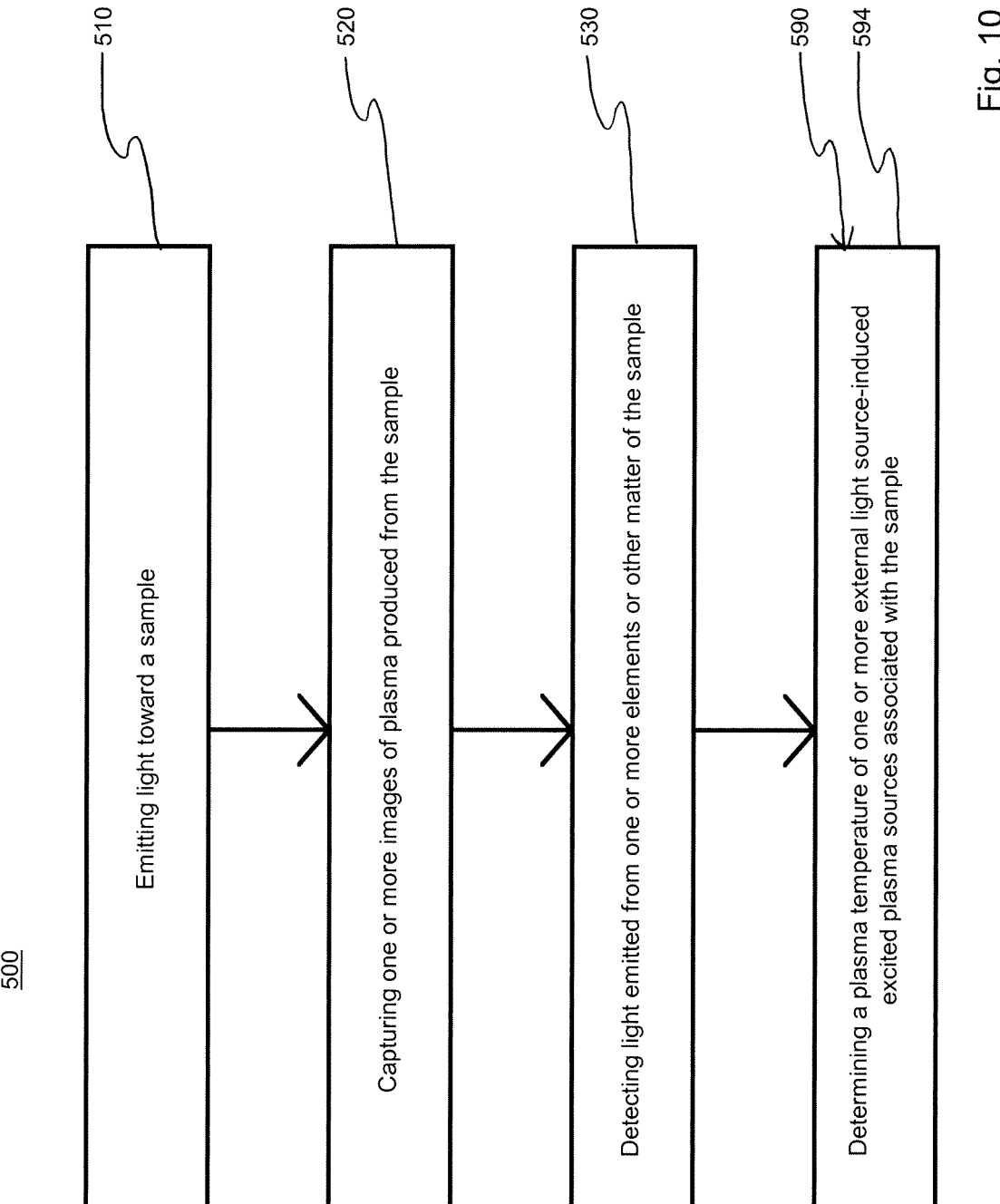
FIG. 10 is a top-level flow chart illustrating another exemplary alternative embodiment of the MECS method of FIG. 6, wherein the MECS method includes determining a plasma temperature of one or more external light source-induced excited plasma sources associated with the sample.

Turning to FIG. 10, the MECS method 500 is illustrated as including, at 594, determining a plasma temperature of one or more external light source-induced excited plasma sources associated with the sample 155 (shown in FIG. 1A).

In selected embodiments, the MECS method 500 can be performed using a portable user-friendly measuring system (not shown). The MECS system 1000 (shown in FIG. 5A), the MECS method 500 (shown in FIG. 6) and the MECS apparatus 100 (shown in FIG. 1A) disclosed herein advantageously can perform real-time multi-element infield analysis of wide range of elements that belong to distinct fields. The MECS system 1000, the MECS method 500 and the MECS apparatus 100 disclosed herein likewise can help eliminate preprocessing and/or preparation of samples that are used for performing the elemental analysis.

Additionally and/or alternatively, the MECS system 1000, the MECS method 500 and the MECS apparatus 100 can enable the portable measuring system to connect to a server system 200 (shown in FIG. 5A) that utilizes various models to analyze outputs that are derived from the MECS apparatus 100 so as to provide recommendations and suggestions for presentation via a display device 300 (shown in FIG. 5A) in real-time, facilitating the user to take necessary actions. The MECS system 1000, the MECS method 500 and the MECS apparatus 100 likewise can aggregate and store a plurality of details pertaining to samples to create a centralized database. Data stored in the centralized database can be used to assess and provide accurate real-time recommendations to users at different geographical locations, wherein the recommendations can be such as, for example, application of fertilizers, time of application or fertilizers, quantity of fertilizers, method of application of fertilizers, etc.

In selected embodiments, the MECS system 1000, the MECS method 500 and the MECS apparatus 100 advantageously can facilitate the portable measuring system in capturing photos, performing element analysis, enzyme activity, measuring pH (or acidity) of samples, measuring temperature of samples, recognizing diseases, and providing recommendations regarding application of pesticides. The MECS system 1000, the MECS method 500 and the MECS apparatus 100 optionally can enable assessment of physical anatomy, thickness, color, and texture of samples using various imaging techniques. Additionally and/or alternatively, the portable measuring system enables measurement of resonance of samples using resonance sensors which in turn helps in measuring phase sense. Measurement of phase sense can help in estimation of permittivity and moisture of samples based on anomalous dispersion and plurality of parameters in the sample chamber 150 (shown in FIG. 1A).

The MECS system 1000, the MECS method 500 and the MECS apparatus 100 optionally can help users in making decisions regarding selection or rejection of samples. Via the MECS system 1000, the MECS method 500 and the MECS apparatus 100, the users can assess and understand phenotypic characterization of material samples 155 using high resolution cameras and electron microscopy processing. The MECS system 1000, the MECS method 500 and the MECS apparatus 100 likewise can help users in predicting color and light properties of samples and utilizes a capacity sensor to measure presence and analyze presence and concentration of enzyme activity. Lastly, the MECS system 1000, the MECS method 500 and the MECS apparatus 100 can simplify the process of measurement of rate of nutrient absorption and concentration, which in turn reduces time and improves efficiency in providing variety of recommendations to users.

Figure 11:
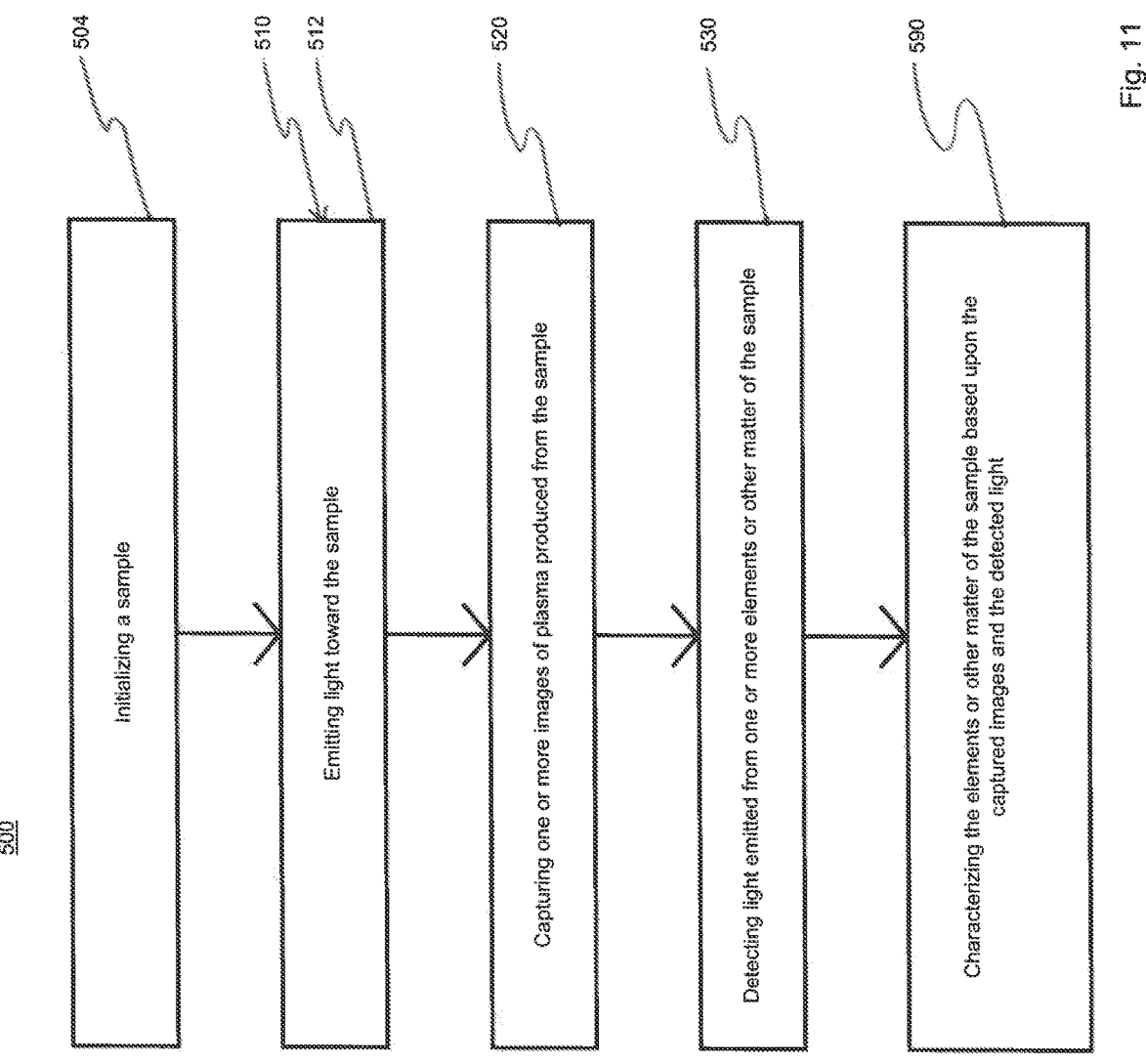
FIG. 11 is a top-level flow chart illustrating still another exemplary alternative embodiment of the MECS method of FIG. 6, wherein the MECS method includes preparing or otherwise initializing the sample.

The MECS method 500 is shown in FIG. 11, as including, at 504, preparing or otherwise initializing a sample 155 (shown in FIG. 1A). The sample 155 can be initialized in any suitable manner for facilitating the characterization of the elements and other matter of the sample, at 590. Light can be emitted toward the sample 155, at 512. The initialization of the sample 155, at 504, preferably can be conducted under one or more ambient conditions. Exemplary ambient conditions can include, but are not limited to, an internal temperature range between twenty degrees Celsius and twenty-four degrees Celsius and/or between sixty percent and eighty-five percent relative humidity. The ambient conditions preferably are maintained throughout the initialization of the sample 155, at 504. Element concentration provided by the accredited laboratory and/or the NIST database can be measured under a similar range of ambient conditions. One or more sensor systems (not shown) associated with the MECS method 500 likewise can perform measurements of the sample 155 under similar ambient conditions.

In selected embodiments, the ambient conditions can comprise controlled the ambient conditions. The ambient conditions can be controlled in any suitable manner, including via controls based upon at least one preselected requirement associated with the sample 155. The initialization of the sample 155, at 504, advantageously can help avoid and/or eliminate human error. Stated somewhat differently, the initialization of the sample 155, at 504, can provide an initialized sample that is very standardized regardless of who is performing the MECS method 500.

Figure 12:
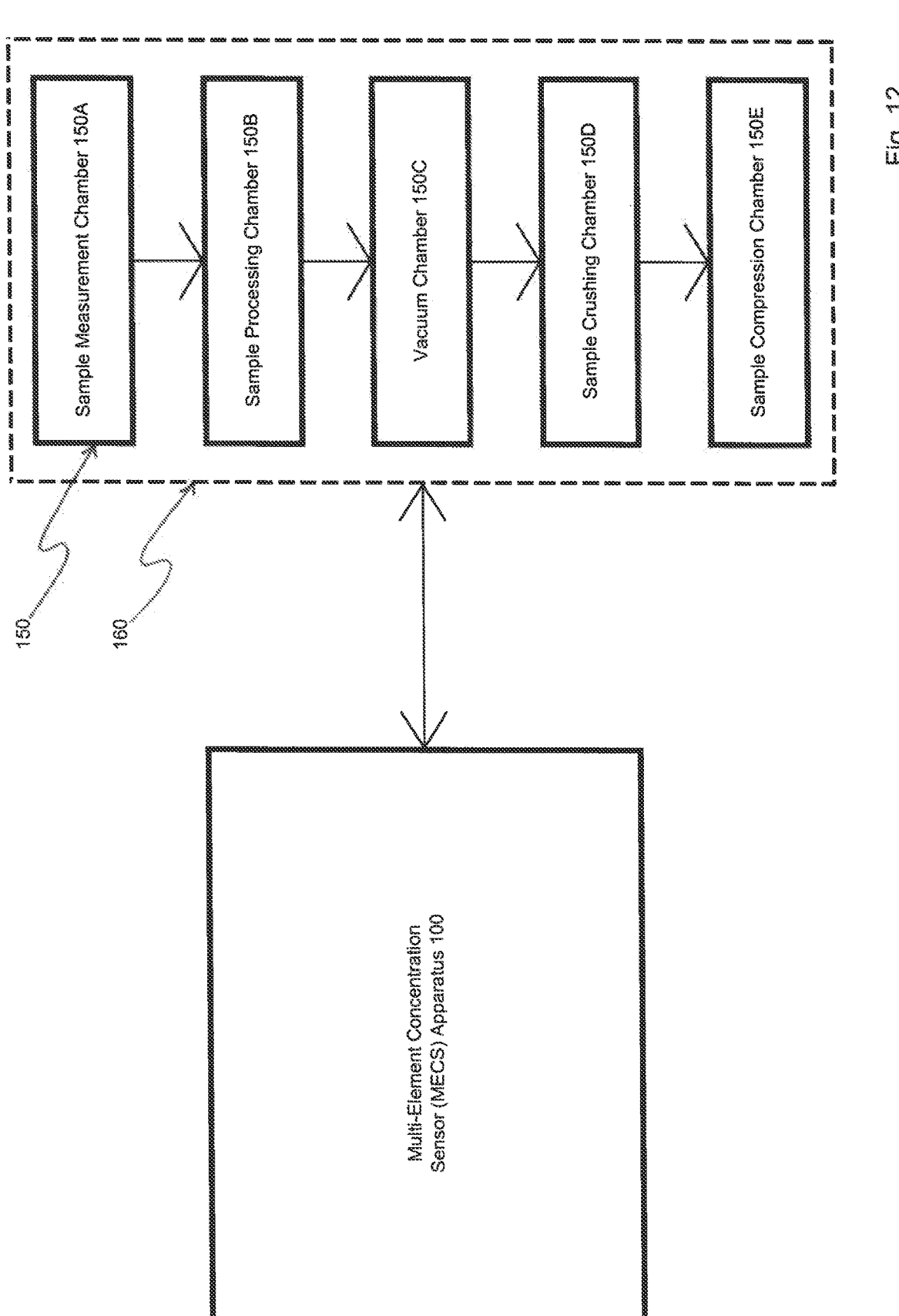
FIG. 12 is a top-level block diagram illustrating an exemplary alternative embodiment of the MECS apparatus of FIG. 1B, wherein the MECS apparatus includes an initialization (or sample preparation) device.

In selected embodiments, the MECS apparatus 100 can be associated with a sample preparation (or initialization) device (or module or circuit) 160 as shown in FIG. 12. The initialization device 160 can initialize a sample 155 (shown in FIGS. 1A-B) for facilitating measurements and/or other characterizations of the sample 155 by the MECS apparatus 100. The initialization device 160, for example, can comprise a portable and/or modular device and/or can be separate from, or at least partially integrated with, the MECS apparatus 100. In other words, the initialization device 160 can be separate from the MECS apparatus 100, partially integrated with the MECS apparatus 100 and/or fully integrated with the MECS apparatus 100.

As illustrated in FIG. 12, the initialization device 160 can include a plurality of sample chambers 150. The sample chambers 150 can be disposed in any predetermined arrangement, such as in a serial, sequential or other suitable arrangement. Exemplary sample chambers 150 of the initialization device 160 can include, but are not limited to, a sample measurement chamber 150A, a sample processing chamber 150B, a vacuum chamber 150C, a sample crushing chamber 150D, and/or a sample compression chamber 150E. The sample chambers 150 can comprise separate sample chambers as illustrated in FIG. 12, and/or a first sample chamber 150 can be at least partially integrated with a second sample chamber 150. The MECS apparatus 100 thereby can initialize a plurality of samples 155 to provide uniform and/or standardized samples.

Figure 13A:
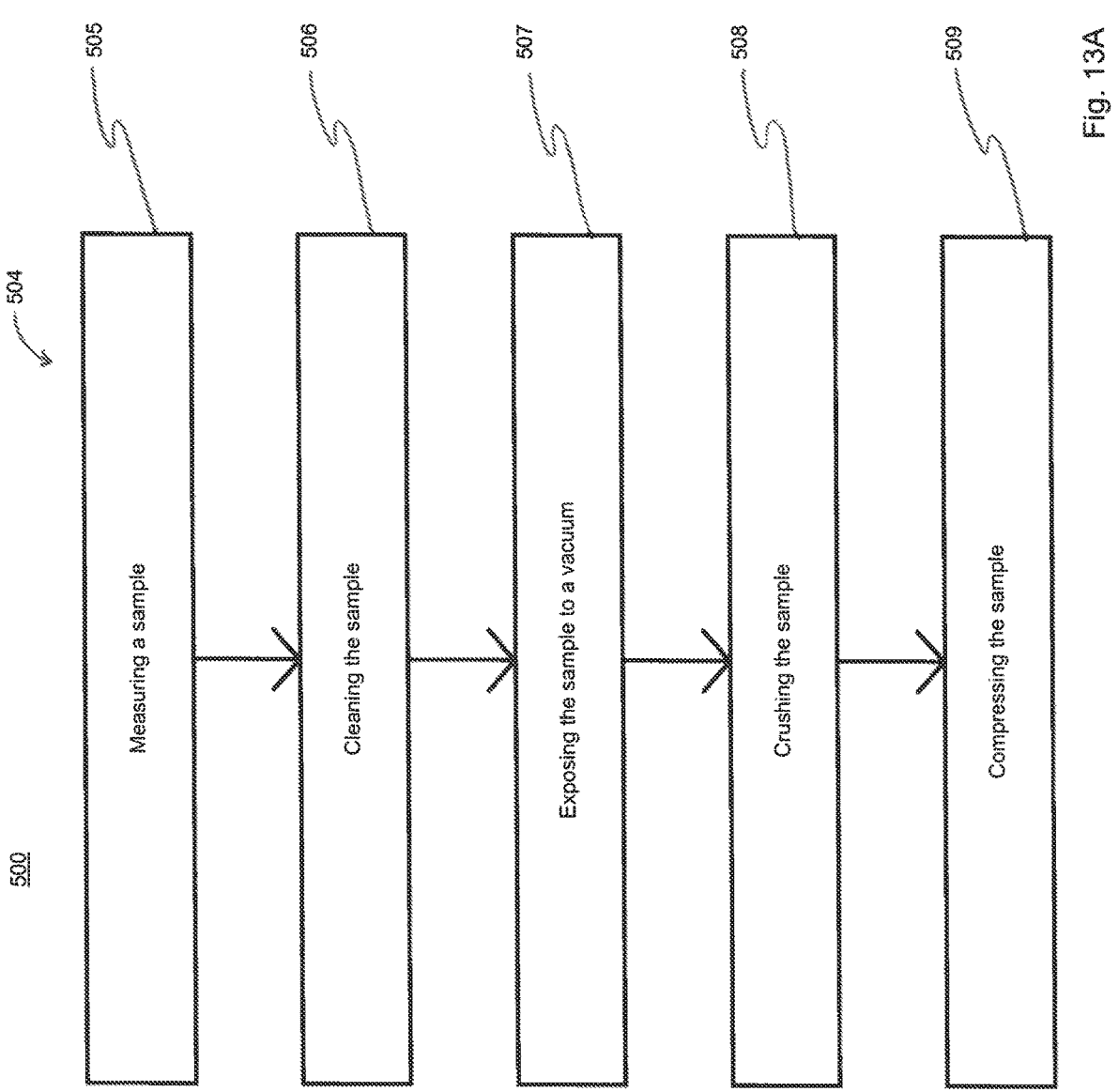
FIG. 13A is a top-level flow chart illustrating an exemplary embodiment of a multi-element concentration sensor (MECS) method of FIG. 11, wherein the sample is measured, processed, exposed to a negative pressure (or vacuum), crushed and compressed.
Figure 13B:
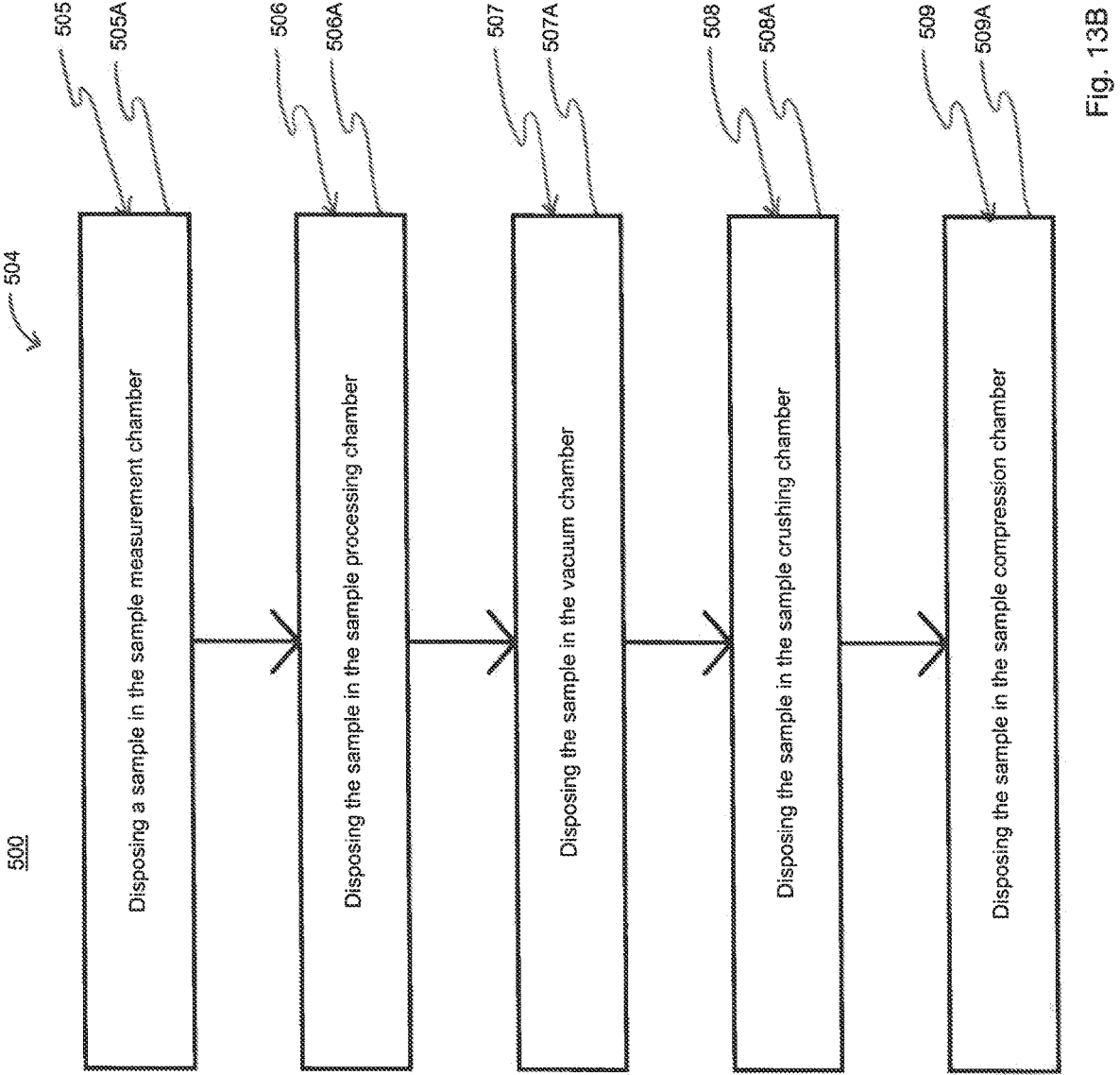
FIG. 13B is a top-level flow chart illustrating an exemplary alternative embodiment of the MECS method of FIG. 13A, wherein the sample is measured, processed, exposed to a negative pressure (or vacuum), crushed and compressed via the MECS apparatus of FIG. 12.

The sample 155 can be initialized in any suitable manner for providing the uniform and/or standardized samples for measurement and/or other characterization. Exemplary manners for initializing a sample 155 (shown in FIGS. 1A-B), at 504, is illustrated in FIGS. 13A-B. In selected embodiments, the selected sample 155 can comprise a final sample that has been subjected to one or more initial processes. Initialization of the sample 155, at 504, advantageously can help ensure that the sample 155 is standardized irrespective of a sample type, such as a crop, of the sample 155. Much uncertainty and inaccuracies, which otherwise can be present while measuring element concentration and otherwise characterizing the sample 155, can be reduced or eliminated by initializing the sample 155, at 504.

Turning to FIG. 13A, a selected sample 155, such as a leaf or a crop, can be initialized by measuring the selected sample 155, at 505. The selected sample 155, for instance, can be rotated, translated, raised, lowered and/or otherwise moved for permitting at least one measurement to be made at each of one or more different locations of the sample 155. The selected sample 155 preferably is moved in a very precise manner for helping to ensure accurate measurements. Moving the selected sample 155 during the measuring, at 505, advantageously can help reduce, or even eliminate, a matrix effect of measurement.

The method 500 can clean the measured sample 155, at 506. The measured sample 155 can be cleaned in any suitable manner. The cleaning, at 506, for example, can include removing any dust or other material that may have settled on the measured sample 155. Upon undergoing the cleaning, at 506, the measured sample 155 can comprise a clean sample 155.

At 507, the clean sample 155 can be exposed to a negative pressure (or a vacuum). In selected embodiments, the negative pressure can be controllable to a predetermined negative pressure level or within a predetermined range of negative pressure levels. Any moisture advantageously can be removed from the clean sample 155. The clean sample 155, for example, can be subjected to a predetermined temperature. Hot air can be directed toward the clean sample 155 for removing the moisture. The moisture thereby can be removed from the clean sample 155 without changing any physiological, physical and/or chemical properties of the clean sample 155.

In selected embodiments, the hot air can have a temperature between forty degrees Celsius and fifty degrees Celsius and can be used to remove moisture in a leaf or other clean sample 155. A resistance-based moisture sensor system (or circuit) (not shown) can help in monitoring the moisture in the clean sample 155. The hot air optionally can be controlled based on moisture data provided by the moisture sensor system. The hot air, for example, can continue to be circulated toward or around the clean sample 155 until the moisture in the clean sample 155 is ten percent always, without limitation. Stated somewhat differently, the clean sample 155 can comprise a dried sample 155 with ten percent moisture.

The dried sample 155 can be crushed, at 508. Stated somewhat differently, the dried sample 155 can be converted into a powder form. At 509, the crushed sample 155 can be compressed into a solid form with a predetermined size, shape and/or other dimension. Exemplary solid forms can include a solid cube, solid rectangle and/or other solid forms, without limitation. In selected embodiments, no external bonding agent is needed to form or maintain the crushed sample 155 in the predetermined size, shape and/or other dimension. In selected embodiments, the predetermined size, shape and/or other dimension of the crushed sample 155 can facilitate disposing the crushed sample 155 within a relevant sample chamber 150 (shown in FIGS. 1B and 11).

The crushed sample 155 can be compressed in any suitable manner. For example, a predetermined pressure can be applied on the crushed sample 155 to form the solid form with the predetermined size, shape and/or other dimension. In selected embodiments, the pressure applied on the crushed sample 155 can be controllable to a predetermined pressure level or within a predetermined range of pressure levels. The pressure applied on the crushed sample 155 optionally can be varied. The pressure to be applied can be determined on a sample-to-sample basis.

An exemplary pressure level between one hundred and fifty megapascal and three hundred megapascal can be applied for a preselected time interval, such as between ten seconds and thirty seconds, without limitation, to make a dried pallet with a diameter of approximately ten millimeters and a thickness between approximately between one millimeter and five millimeters. It will be appreciated the pressure level and/or duration can vary based on the type of leaf, crop or other sample 155 and/or one or more physiological characteristics of the leaf, crop or other sample 155. Advantageously, the compression of the crushed sample 155 can provide the solid form with at least one smooth surface for carrying out the sample characterization.

In selected embodiments, a predetermined concentration of additive can be added to the sample 155 during initialization, at 504. An exemplary additive concentration can include, but is not limited to, a five percent concentration while measuring macro nutrients and ten thousand parts per million (ppm) while measuring micro nutrients. The additive advantageously can aid measurement and characterization of the sample 155. If provided as a reference additive, the additive can comprise a predetermined reference concentration of one or more preselected nutrients. In selected embodiments, the predetermined reference nutrient concentration can be used as a basis for performing at least one reference measurement for the other nutrients.

The sample 155 optionally can be initialized, at 504, via the initialization device 160 (shown in FIG. 12). Turning to FIGS. 12 and 13B, for example, the MECS method 500 is shown as initializing a selected sample 155 (shown in FIGS. 1A-B), at 504, by disposing the selected sample 155 within an interior chamber defined by the sample measurement chamber 150A, at 505A. The selected sample 155, in other words, can be enabled to be disposed in the sample measurement chamber 150A, for example, via a human operator or a mechanical sample handling system (or circuit) (not shown).

The sample measurement chamber 150A can be configured to measure the selected sample 155, for example, in the manner discussed in more detail above with reference to measuring the selected sample 155, at 505, in FIG. 13A. In selected embodiments, the sample measurement chamber 150A can rotate, translate, raise, lower and/or otherwise move the selected sample 155 for permitting at least one measurement to be made at each of one or more different locations of the selected sample 155. The selected sample 155 preferably is moved in a very precise manner for helping to ensure accurate measurements. The movement of the selected sample 155 advantageously can help reduce, or even eliminate, a matrix effect of measurement.

The measured sample 155 can be disposed, at 506A, within an interior chamber defined by the sample processing chamber 150B. The measured sample 155, in other words, can be enabled to be disposed in the sample processing chamber 150B, for example, via the human operator or the mechanical sample handling system. The sample processing chamber 150B can be configured to clean the measured sample 155, for example, in the manner discussed in more detail above with reference to cleaning the selected sample 155, at 506, in FIG. 13A. A size, shape and/or other dimension of the interior chamber defined by the sample processing chamber 150B preferably is sufficient to receive a predetermined amount of the measured sample 155 as prescribed by a sample requirement associated with the measured sample 155. In selected embodiments, the sample processing chamber 150B can include a fan system (or circuit) (not shown) for removing any dust or other material that may have settled on the measured sample 155 during a cleaning cycle of the sample initialization, at 504.

At 507A, the clean sample 155 can be disposed within an interior chamber defined by the vacuum chamber 150C. The clean sample 155, in other words, can be enabled to be disposed in the vacuum chamber 150C, for example, via the human operator or the mechanical sample handling system. The vacuum chamber 150C can be configured to expose the clean sample to a negative pressure (or a vacuum). The vacuum chamber 150C can be configured to expose the clean sample 155 to the negative pressure, for example, in the manner discussed in more detail above with reference to exposing the clean sample 155 to a vacuum, at 507, in FIG. 13A. In selected embodiments, the negative pressure can be controllable to a predetermined negative pressure level or within a predetermined range of negative pressure levels.

In selected embodiments, the vacuum chamber 150 can include a mesh shelf (not shown), a heating device (or circuit) (not shown) and an air circulation device (or circuit) (not shown). The clean sample 155 can be disposed on the mesh shelf, and air heated by the heating device can be circulated about the clean sample 155. Any moisture advantageously can be removed from the clean sample 155. The clean sample 155, for example, can be subjected to a predetermined temperature. Hot air can be directed toward the clean sample 155 for removing the moisture. The moisture thereby can be removed from the clean sample 155 without changing any physiological, physical and/or chemical properties of the clean sample 155.

The dried sample 155 can be disposed, at 508A, within an interior chamber defined by the sample crushing chamber 150D. In other words, the dried sample 155 can be enabled to be disposed in the sample crushing chamber 150D, for example, via the human operator or the mechanical sample handling system. The sample crushing chamber 150D can be configured to crush the dried sample 155, for example, in the manner discussed in more detail above with reference to crushing the dried sample 155, at 508, in FIG. 13A. In selected embodiments, the dried sample 155 can be converted into a powder form.

At 509A, the crushed sample 155 can be disposed within an interior chamber defined by the sample compression chamber 150E. The crushed sample 155, in other words, can be enabled to be disposed in the sample compression chamber 150E, for example, via the human operator or the mechanical sample handling system. The sample compression chamber 150E can be configured to compress the crushed sample. The sample compression chamber 150E can be configured to compress the crushed sample 155, for example, in the manner discussed in more detail above with reference to compressing the crushed sample 155, at 509, in FIG. 13A.

The sample compression chamber 150E, for example, can compress the crushed sample 155 into a solid form with a predetermined size, shape and/or other dimension. Exemplary solid forms can include a solid cube, solid rectangle and/or other solid forms, without limitation. In selected embodiments, no external bonding agent is needed to form or maintain the crushed sample 155 in the predetermined size, shape and/or other dimension. In selected embodiments, the predetermined size, shape and/or other dimension of the crushed sample 155 can facilitate disposing the crushed sample 155 within a relevant sample chamber 150 (shown in FIGS. 1B and 11).

The crushed sample 155 can be compressed in any suitable manner. For example, a predetermined pressure can be applied on the crushed sample 155 to form the solid form with the predetermined size, shape and/or other dimension. In selected embodiments, the pressure applied on the crushed sample 155 can be controllable to a predetermined pressure level or within a predetermined range of pressure levels. The pressure applied on the crushed sample 155 optionally can be varied. The pressure to be applied can be determined on a sample-to-sample basis. Advantageously, the compression of the crushed sample 155 can provide the solid form with at least one smooth surface for carrying out the sample characterization.

Those skilled in the art will realize that the above recognized advantages and other advantages described herein are merely exemplary and are not meant to be a complete rendering of all of the advantages of the various embodiments set forth in the present disclosure.

The apparatus, as described in the present disclosure or any of its components may be embodied in the form of a computing device. The computing device can be, for example, a general-purpose computer, a smartphone, a programmed microprocessor, a micro-controller, a peripheral integrated circuit element, and other devices or arrangements of devices, without limitation, which are capable of implementing the steps that constitute the method disclosed herein. The computing device includes a processor, a memory, a non-volatile data storage, a display, and a user interface.

In selected embodiments, one or more of the features disclosed herein can be provided as a computer program product being encoded on one or more non-transitory machine-readable storage media. As used herein, a phrase in the form of at least one of A, B, C and D herein is to be construed as meaning one or more of A, one or more of B, one or more of C and/or one or more of D. Likewise, a phrase in the form of A, B, C or D as used herein is to be construed as meaning A or B or C or D. For example, a phrase in the form of A, B, C or a combination thereof is to be construed as meaning A or B or C or any combination of A, B and/or C.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method, comprising:
   directing a first light toward a sample, the directed first light vaporizing a matter from the sample and creating plasma;
   capturing one or more images of the plasma;
   detecting a second light radiating from the plasma;
   extracting, independent of clock information, timing information from the detected second light radiating from the plasma, wherein the clock information corresponds to synchronized clocks in a network; and
   characterizing the matter of the sample based on a sequence of image frames presented with predetermined image timings of the captured one or more images of the plasma and the extracted timing information from the detected second light radiating from the plasma.

2. The method of claim 1, wherein the sample comprises at least one of a first element from a periodic table, a second element beyond the periodic table, a soil sample, a material sample, a plant sample, or a leaf sample.

3. The method of claim 1, further comprising disposing the sample in a sample case before the directing of the first light toward the sample.

4. The method of claim 1, wherein the directing of the first light toward the sample comprises directing light pulses toward the sample.

5. The method of claim 1, wherein the capturing of the one or more images of the plasma comprises at least one of capturing at least one still image of the plasma or capturing at least one video image of the plasma.

6. The method of claim 1, further comprising:
converting the detected second light radiating from the plasma to discrete wavelength bands; and
suppressing out-of-band background light noise from the discrete wavelength bands.

7. The method of claim 6, wherein the converting of the detected second light radiating from the plasma comprises converting the detected second light via wavelength-division multiplexing.

8. The method of claim 1, further comprising modulating the detected second light radiating from the plasma to reduce an average power delivered by an electrical signal.

9. The method of claim 1, wherein the detecting of the second light radiating from the plasma comprises detecting light pulses radiating from the plasma.

10. The method of claim 9, further comprising controlling a number of the detected light pulses radiating from the plasma.

11. The method of claim 1, further comprising performing a calibration on at least one of heterogeneity, analysis times, instrument stability during analyses, protective thin films, sample thickness, sample width, analyte interferences, detector resolution, power source fluctuations and instrumental drift, moisture, or water content.

12. The method of claim 11, wherein the performing of the calibration comprises performing the calibration in a real time manner.

13. The method of claim 1, wherein the characterizing of the matter comprises determining a plasma temperature of one or more external light source-induced excited plasma sources associated with the sample.

14. A computer program product for performing multi-element analysis on a sample, the computer program product being encoded on one or more non-transitory machine-readable storage media and comprising instructions to perform operations, the operations comprising:

directing a first light toward the sample, the directed first light vaporizing a matter from the sample and creating plasma;
capturing one or more images of the plasma;
detecting a second light radiating from the plasma;
extracting, independent of clock information, timing information from the detected second light radiating from the plasma, wherein the clock information corresponds to synchronized clocks in a network; and
characterizing the matter of the sample based on a sequence of image frames presented with predetermined image timings of the captured one or more images of the plasma and the extracted timing information from the detected second light radiating from the plasma.

15. An apparatus, comprising:
a light emitting circuit configured to direct a first light toward a sample, wherein the directed first light vaporizes a matter from the sample and creates plasma;
an image capturing circuit configured to capture one or more images of the plasma;
a light receiving circuit configured to detect a second light that radiates from the plasma;
a clock extraction subsystem configured to extract, independent of clock information, timing information from the detected second light radiating from the plasma, wherein the clock information corresponds to synchronized clocks in a network; and
a circuit configured to characterize the matter of the sample based on a sequence of image frames presented with predetermined image timings of the captured one or more images of the plasma and the extracted timing information from the detected second light that radiates from the plasma.

16. A system, comprising:
the apparatus of claim 15;
a server circuit configured to:
analyze the characterization of the matter of the sample; and
generate a sample-specific recommendation based on the analysis of the characterization of the matter of the sample; and
a display device configured to present the generated sample-specific recommendation.

17. The method of claim 1, further comprising supplying the timing information from a clock extraction subsystem to a phase-locked loop, wherein the phase-locked loop is configured to control a clock for recovered upstream information.

18. The method of claim 17, further comprising storing, in a memory system, the recovered upstream information as calibration models, wherein the recovered upstream information comprises qualitative and quantitative data of the sample.

* * * * *